(12) United States Patent
Ikeda et al.

(10) Patent No.: US 10,592,193 B2
(45) Date of Patent: *Mar. 17, 2020

(54) DISPLAY DEVICE

(71) Applicant: Semiconductor Energy Laboratory Co., Ltd., Kanagawa-ken (JP)

(72) Inventors: Hisao Ikeda, Kanagawa (JP); Nozomu Sugisawa, Kanagawa (JP); Yuichi Yanagisawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,261

(22) Filed: Dec. 28, 2017

(65) Prior Publication Data

US 2018/0196629 A1  Jul. 12, 2018

Related U.S. Application Data

(63) Continuation of application No. 14/800,033, filed on Jul. 15, 2015, now Pat. No. 9,858,028.

(30) Foreign Application Priority Data

Jul. 18, 2014  (JP) .................................. 2014-147636

(51) Int. Cl.
*G06F 3/14* (2006.01)
*G06F 3/041* (2006.01)
(Continued)

(52) U.S. Cl.
CPC ............ *G06F 3/1446* (2013.01); *G06F 3/042* (2013.01); *G06F 3/0412* (2013.01);
(Continued)

(58) Field of Classification Search
CPC ........ G06F 3/1446; G06F 3/0412; G06F 3/14; G06F 3/041; G02F 1/13; G09G 2300/026; G09G 2380/02; G09G 2300/0426
See application file for complete search history.

(56) References Cited

U.S. PATENT DOCUMENTS 5,801,797 A  9/1998 Iida et al.
7,399,991 B2  7/2008 Seo et al.
(Continued)

FOREIGN PATENT DOCUMENTS

EP  3 190 476 A1  7/2017
JP  2001-083548 A  3/2001
(Continued)

*Primary Examiner* — Md Saiful A Siddiqui
(74) *Attorney, Agent, or Firm* — Husch Blackwell LLP

(57) ABSTRACT

To provide a display device that is suitable for increasing in size. To provide a display device in which display unevenness is suppressed. In a display device, a plurality of display panels are arranged to partly overlap one another. In two of the overlapping display panels, a display panel positioned on the display surface side includes a region transmitting visible light that is adjacent to a display portion, and the region transmitting visible light overlaps with a pixel of a display panel positioned on the lower side. Furthermore, in at least a display portion of the display panel placed on the lower side, an aperture ratio of the pixel overlapping with the region transmitting visible light of the display panel on the upper side is higher than an aperture ratio of another pixel.

16 Claims, 19 Drawing Sheets

(51) Int. Cl.
*G06F 3/042* (2006.01)
*G02F 1/1333* (2006.01)

(52) U.S. Cl.
CPC ...... *G02F 1/13338* (2013.01); *G02F 2201/40* (2013.01); *G09G 2300/026* (2013.01); *G09G 2300/0426* (2013.01); *G09G 2380/02* (2013.01)

(56) References Cited

U.S. PATENT DOCUMENTS

| | | | |
|---|---|---|---|
| 7,663,149 | B2 | 2/2010 | Seo et al. |
| 8,367,440 | B2 | 2/2013 | Takayama et al. |
| 8,415,208 | B2 | 4/2013 | Takayama et al. |
| 8,432,514 | B2 | 4/2013 | Kim |
| 8,477,089 | B2 | 7/2013 | Kim |
| 8,803,816 | B2 | 8/2014 | Kilpatrick, II et al. |
| 8,836,611 | B2 | 9/2014 | Kilpatrick, II et al. |
| 8,860,632 | B2 | 10/2014 | Kilpatrick, II et al. |
| 8,860,765 | B2 | 10/2014 | Kilpatrick, II et al. |
| 8,863,038 | B2 | 10/2014 | King et al. |
| 8,866,840 | B2 | 10/2014 | Dahl et al. |
| 8,873,002 | B2 | 10/2014 | Kim |
| 8,933,874 | B2 | 1/2015 | Lundqvist et al. |
| 8,947,320 | B2 | 2/2015 | King et al. |
| 9,009,984 | B2 | 4/2015 | Caskey et al. |
| 9,625,756 | B2 | 4/2017 | Kim |
| 2003/0090198 | A1 | 5/2003 | Aston |
| 2005/0285811 | A1* | 12/2005 | Kawase ............. G02F 1/13336 345/1.1 |
| 2010/0117928 | A1* | 5/2010 | Shim ................. G06F 1/1601 345/1.3 |
| 2010/0164906 | A1* | 7/2010 | Fukunaga ........... G06F 3/0412 345/175 |
| 2010/0177018 | A1 | 7/2010 | Wang et al. |
| 2011/0050657 | A1 | 3/2011 | Yamada |
| 2011/0057861 | A1* | 3/2011 | Cok .................... H01L 27/3293 345/1.3 |
| 2012/0268445 | A1 | 10/2012 | Ogata et al. |
| 2013/0200783 | A1 | 8/2013 | Van Heck et al. |
| 2013/0201636 | A1 | 8/2013 | Van Den Brand et al. |
| 2013/0201637 | A1 | 8/2013 | De Kok et al. |
| 2013/0214324 | A1 | 8/2013 | Takayama et al. |
| 2013/0335304 | A1* | 12/2013 | Yang .................. H04N 13/0434 345/32 |
| 2015/0028316 | A1* | 1/2015 | Kojima ............... H01L 51/5212 257/40 |
| 2015/0228704 | A1 | 8/2015 | Miyake et al. |
| 2016/0014882 | A1 | 1/2016 | Jongman et al. |

FOREIGN PATENT DOCUMENTS

| | | |
|---|---|---|
| JP | 2002-324673 A | 11/2002 |
| JP | 2003-174153 A | 6/2003 |
| JP | 2005-114839 A | 4/2005 |
| JP | 2012-502321 | 1/2012 |
| JP | 2012-028638 A | 2/2012 |
| JP | 2013-015680 A | 1/2013 |
| JP | 2013-156452 A | 8/2013 |
| WO | WO 2010/028394 A1 | 3/2010 |
| WO | WO 2010/028397 A1 | 3/2010 |
| WO | WO 2010/028399 A1 | 3/2010 |
| WO | WO 2010/028402 A1 | 3/2010 |
| WO | WO 2010/028403 A1 | 3/2010 |
| WO | WO 2010/028404 A1 | 3/2010 |
| WO | WO 2010/028405 A1 | 3/2010 |
| WO | WO 2010/028406 A1 | 3/2010 |
| WO | WO 2010/028407 A1 | 3/2010 |

* cited by examiner

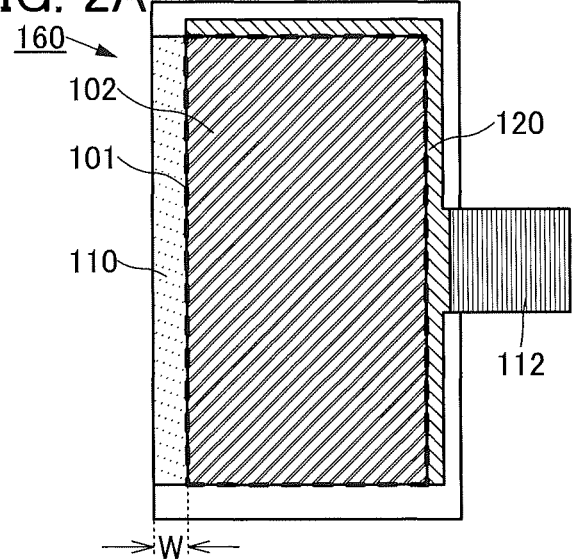
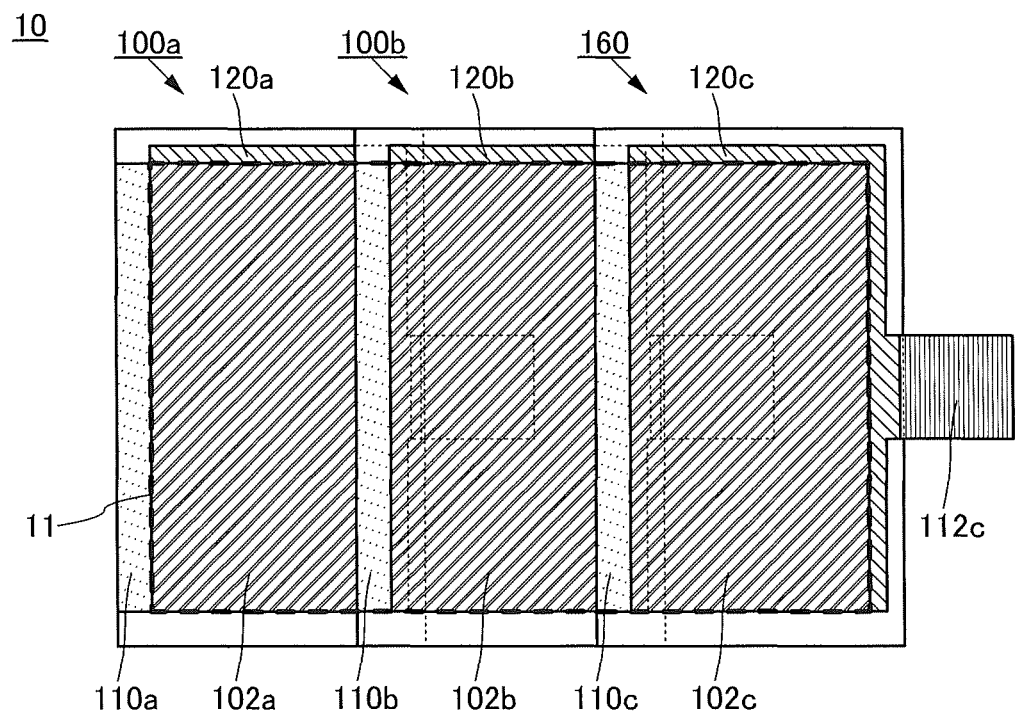

500

DISPLAY DEVICE

This application is a continuation of copending U.S. application Ser. No. 14/800,033, filed on Jul. 15, 2015 which is incorporated herein by reference.

BACKGROUND OF THE INVENTION

1. Field of the Invention

One embodiment of the present invention relates to a display device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a lighting device, a power storage device, a storage device, a method for driving any of them, and a method for manufacturing any of them.

2. Description of the Related Art

In recent years, larger display devices have been required. For example, a television device for home use (also referred to as a TV or a television receiver), digital signage, and a public information display (PID) are given. Larger digital signage, PID, and the like can provide the increased amount of information, and attract more attention particularly when used for advertisement or the like, so that the effectiveness of the advertisement can be increased.

Examples of the display device include, typically, a liquid crystal display device, a light-emitting device including a light-emitting element such as an organic electroluminescent (EL) element or a light-emitting diode (LED), and an electronic paper performing display by an electrophoretic method or the like.

For example, in a basic structure of an organic EL element, a layer containing a light-emitting organic compound is provided between a pair of electrodes. By voltage application to this element, the light-emitting organic compound can emit light. A display device including such an organic EL element needs no backlight which is necessary for liquid crystal display devices and the like; therefore, thin, lightweight, high contrast, and low power consumption display devices can be obtained. Patent Document 1, for example, discloses an example of a display device using organic EL elements.

Furthermore, Patent Document 2 discloses a flexible active matrix light-emitting device in which an organic EL element and a transistor serving as a switching element are provided over a film substrate.

REFERENCES

Patent Documents

[Patent Document 1] Japanese Published Patent Application No. 2002-324673

[Patent Document 2] Japanese Published Patent Application No. 2003-174153

SUMMARY OF THE INVENTION

An object of one embodiment of the present invention is to provide a display device that is suitable for increasing in size. Another object of one embodiment of the present invention is to provide a display device in which display unevenness is suppressed. Another object of one embodiment of the present invention is to provide a display device that can display an image along a curved surface. Another object of one embodiment of the present invention is to provide a display device that easily achieves a reduction in thickness or weight.

Another object of one embodiment of the present invention is to provide a novel display device, an electronic device, or the like.

Note that the descriptions of these objects do not disturb the existence of other objects. In one embodiment of the present invention, there is no need to achieve all the objects. Objects other than the above objects will be apparent from and can be derived from the description of the specification and the like.

One embodiment of the present invention is a display device including a first display panel and a second display panel. The first display panel includes a first region including a first pixel and a second pixel. The second display panel includes a second region, a third region, and a fourth region. The second region includes a third pixel. The third region has a function of transmitting visible light. The fourth region has a function of blocking visible light. The second pixel of the first display panel and the third region of the second display panel overlap with each other in a region. An aperture ratio of the second pixel is higher than an aperture ratio of the first pixel.

In the above description, it is preferable that the first display panel include a light-blocking layer, the first pixel include a first display element, and the second pixel include a second display element. Furthermore, it is preferable that the light-blocking layer include a first opening and a second opening, the first opening and the first display element overlap with each other in a region, the second opening and the second display element overlap with each other in a region, and an area of the second opening be larger than an area of the first opening.

In the above description, it is preferable that the first display element and the second display element be light-emitting elements or liquid crystal elements.

In the above description, it is preferable that the first display panel and the second display panel each have a pair of substrates and the substrates have flexibility.

Another embodiment of the present invention is a display device including a first display panel, a second display panel, and a third display panel. Here, the first display panel includes a first region including a first pixel, a second pixel, and a third pixel. The second display panel includes a second region, a third region, and a fourth region. The third display panel includes a fifth region, a sixth region, and a seventh region. The second region includes a fourth pixel, and the fifth region includes a fifth pixel. The third region and the sixth region each have a function of transmitting visible light, and the fourth region and the seventh region each have a function of blocking visible light. The second pixel of the first display panel and the third region of the second display panel overlap with each other in a region. The third pixel of the first display panel, the third region of the second display panel, and the sixth region of the third display panel overlap with each other in a region. An aperture ratio of the second pixel is higher than an aperture ratio of the first pixel, and an aperture ratio of the third pixel is higher than an aperture ratio of the second pixel.

In the above description, it is preferable that the first display panel include a light-blocking layer, the first pixel include a first display element, the second pixel include a second display element, and the third pixel include a third display element. Furthermore, it is preferable that the light-blocking layer include a first opening, a second opening, and a third opening, the first opening and the first display element overlap with each other in a region, the second opening and the second display element overlap with each other in a region, the third opening and the third display element overlap with each other in a region, an area of the second opening be larger than an area of the first opening, and an area of the third opening be larger than an area of the second opening.

In the above description, it is preferable that the first display element, the second display element, and the third display element be light-emitting elements or liquid crystal elements.

In the above description, it is preferable that the first display panel, the second display panel, and the third display panel each have a pair of substrates, and the substrates have flexibility.

In the above description, it is preferable that the first display panel include an FPC, the FPC include a region overlapping with the second region of the second display panel, and the FPC be located on a side opposite to a display surface side of the second display panel.

Another embodiment of the present invention is a display module including the display device and a touch sensor.

Another embodiment of the present invention is an electronic device including a housing and one of the display devices and the display module. It is preferable that the housing include at least one of a button, a microphone, a speaker, an antenna, and a battery.

One embodiment of the present invention can provide a display device that is suitable for increasing in size. One embodiment of the present invention can provide a display device in which display unevenness is suppressed. One embodiment of the present invention can provide a display device that can display an image along a curved surface. One embodiment of the present invention can provide a display device that easily achieves a reduction in thickness or weight.

One embodiment of the present invention can provide a novel display device (display panel) or a novel electronic device. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 2A and 2B illustrate a display device of one embodiment.

DETAILED DESCRIPTION OF THE INVENTION

Figure 1A:
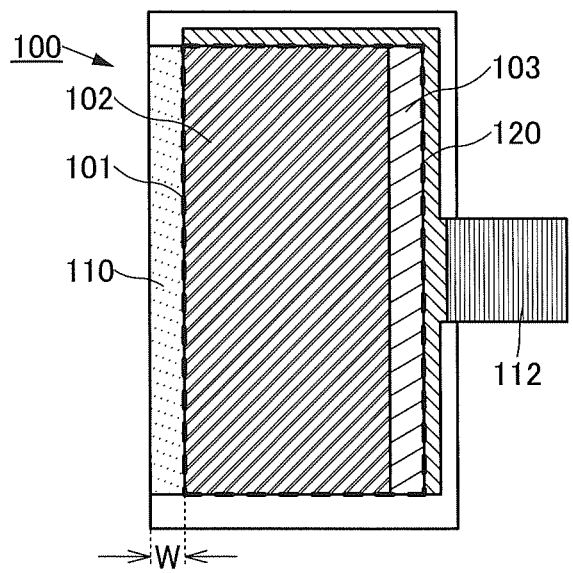
FIGS. 1A and 1B illustrate a display device of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Note that the terms "film" and "layer" can be interchanged with each other. For example, in some cases, the term "conductive film" can be used instead of the term "conductive layer," and the term "insulating layer" can be used instead of the term "insulating film."

Embodiment 1

In this embodiment, structure examples of a display device of one embodiment of the present invention are described with reference to drawings.

One embodiment of the present invention is a display device capable of increasing its size by arranging a plurality of display panels to partly overlap one another. In two of the overlapping display panels, at least a display panel positioned on the display surface side (upper side) includes a region transmitting visible light that is adjacent to a display portion. A pixel of a display panel positioned on the lower side and the region transmitting visible light of the display panel positioned on the upper side are provided to overlap with each other. Thus, the two of the overlapping display panels can display a seamless and contiguous image when seen from the display surface side (in a planar view).

Furthermore, in at least a display portion of the display panel positioned on the lower side, an aperture ratio of the pixel overlapping with the region transmitting visible light of the display panel on the upper side is higher than an aperture ratio of another pixel. As a result, the luminance of an image displayed on the region overlapping with the region transmitting visible light of the display panel on the upper side can be substantially the same as the luminance of an image displayed on another region. This can be achieved even when the light transmittance of the region transmitting visible light is less than 100% and pixels in these regions are made to perform display at the same gray level. Consequently, a reduction in display quality due to visually recognized seams can be suppressed.

Specifically, the following structure can be employed for example.

In the description to be given below, a display device of one embodiment of the present invention and a display panel included in the display device are described with reference to drawings.

[Display Panel]

FIG. 1A is a schematic top view of a display panel 100 included in a display device of one embodiment of the present invention.

The display panel 100 includes a display region 101, and a region 110 transmitting visible light and a region 120 having a portion blocking visible light that are adjacent to the display region 101. The display panel 100 is provided with a flexible printed circuit (FPC) 112 in the example illustrated in FIG. 1A.

Here, an image can be displayed on the display region 101 even when the display panel 100 is used independently. Therefore, the display panel 100 is also one embodiment of a display device.

The display region 101 includes a first region 102 and a second region 103. The display region 101 includes a plurality of pixels arranged in matrix and can display an image. One or more display elements are provided in each pixel. Typical examples of the display element include a liquid crystal element and a light-emitting element such as an organic EL element.

In the region 110, for example, a pair of substrates included in the display panel 100, a sealant for sealing the display element sandwiched between the pair of substrates, and the like may be provided. Here, for members provided in the region 110, materials that transmit visible light are used.

In the region 120, for example, a wiring electrically connected to the pixels included in the display region 101 is provided. In addition to the wiring, driver circuits (such as a scan line driver circuit and a signal line driver circuit) for driving the pixels and a circuit such as a protective circuit may be provided. Furthermore, the region 120 includes a region where a terminal electrically connected to the FPC 112 (also referred to as a connection terminal), a wiring electrically connected to the terminal, and the like are provided.

[Display Device]

Figure 1B:
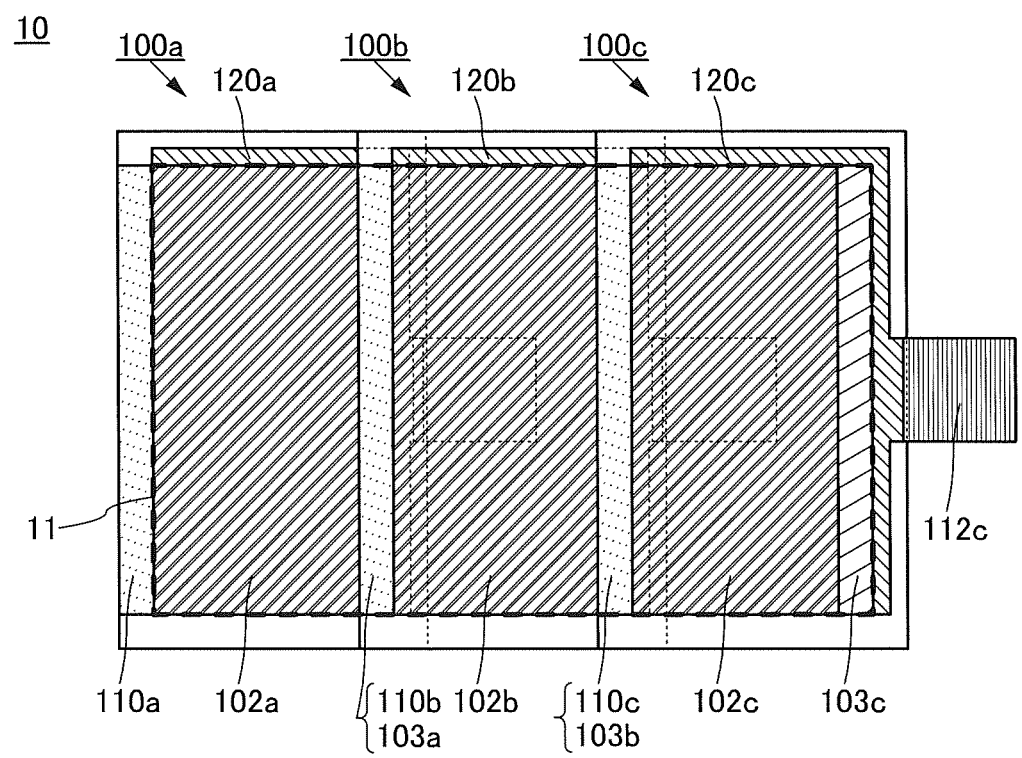

A display device 10 of one embodiment of the present invention includes a plurality of such display panels 100. FIG. 1B is a schematic top view of the display device 10 including three display panels 100.

Hereinafter, to distinguish the display panels from each other, the same components included in the display panels from each other, or the same components relating to the display panels from each other, letters are added to reference numerals of them. Unless otherwise specified, in a plurality of display panels partly overlapping with each other, "a" is added to reference numerals for a display panel placed on the lowest side (the side opposite to the display surface side), components thereof, and the like, and to one or more display panels placed on the upper side of the display panel, components thereof, and the like, "b" or letters after "b" in alphabetical order are added from the lower side. Furthermore, unless otherwise specified, in describing a structure in which a plurality of display panels is included, letters are not added when a common part of the display panels, the components, or the like is described.

The display device 10 in FIG. 1B includes a display panel 100a, a display panel 100b, and a display panel 100c. Furthermore, display regions 101a to 101c, regions 110a to 110c, regions 120a to 120c, first regions 102a to 102c, second regions 103a to 103c, an FPC 112c, and the like are shown in FIG. 1B.

The display panel 100b is placed so that part of the display panel 100b overlaps an upper side (a display surface side) of the display panel 100a. Specifically, the display panel 100b is placed so that the region 110b transmitting visible light of the display panel 100b overlaps the second region 103a in the display region 101a of the display panel 100a, and the display region 101a of the display panel 100a and the region 120b blocking visible light of the display panel 100b do not overlap each other.

Furthermore, the display panel 100c is placed so that part of the display panel 100c overlaps an upper side (a display surface side) of the display panel 100b. Specifically, the display panel 100c is placed so that the region 110c transmitting visible light of the display panel 100c overlaps the second region 103b in the display region 101b of the display panel 100b, and the display region 101b of the display panel 100b and the region 120c blocking visible light of the display panel 100c do not overlap each other.

The region 110b transmitting visible light overlaps the second region 103a of the display region 101a; thus, the whole display region 101a can be visually recognized from the display surface side. Similarly, the region 110c overlaps the second region 103b of the display region 101b; thus, the whole display region 101b can be visually recognized from the display surface side. Therefore, a region where the display region 101a, the display region 101b, and the display region 101c are provided seamlessly can serve as the display region 11 of the display device 10.

Furthermore, the aperture ratio of a pixel in the second region 103a of the display region 101a is higher than the aperture ratio of a pixel in the first region 102a. Therefore, when the pixel in the second region 103a overlapping with the region 110b transmitting visible light of the display panel 100b and the pixel in the first region 102a are made to perform display at the same gray level, the intensity of light emitted from the first region 102a can be equal to the intensity of light transmitted through the region 110b and emitted from the second region 103a. As a result, the overlap of the display panel 100a and the display panel 100b is less likely to be visually recognized. Similarly, the overlap of the display panel 100b and the display panel 100c is less likely to be visually recognized. Thus, a favorable image without a seam can be displayed on the display region 11 of the display device 10.

Here, the width W of the region 110 in FIG. 1A is greater than or equal to 0.1 mm and less than or equal to 200 mm, more preferably greater than or equal to 0.5 mm and less than or equal to 150 mm, much more preferably greater than or equal to 1 mm and less than or equal to 100 mm, much more preferably greater than or equal to 2 mm and less than or equal to 50 mm. The region 110 serves as a sealing region, and as the width W of the region 110 is larger, the distance between an end surface of the display panel 100 and the display region 101 can become longer, so that entry of an impurity such as water into the display region 101 from the outside can be effectively suppressed.

In particular, in this structure example, the region 110 is provided adjacent to the display region 101; thus, it is important to set the width W of the region 110 at an appropriate value. For example, in the case where an organic EL element is used as the display element or the case where a transistor (in particular, a transistor including an oxide semiconductor) is used in a pixel, the width W of the region 110 is set to be greater than or equal to 1 mm, whereby deterioration of the organic EL element or the transistor can be effectively suppressed; thus, reliability can be increased. Note that also in a part other than the region 110, the distance between the end portion of the display region 101 and the end surface of the display panel 100 is preferably in the above range.

A difference between the aperture ratio of a pixel provided in the first region 102 and the aperture ratio of a pixel provided in the second region 103 may be set as appropriate depending on the transmittance of the region 110 transmitting visible light of the display panel over the second region 103. For example, when an average value of transmittances of the region 110 with respect to light in a visible region (e.g., from a wavelength of 400 nm to a wavelength of 750 nm) is assumed to be $T_{ave}$, the aperture ratio of the pixel in the second region 103 may be a value which is $1/T_{ave}$ times as large as the aperture ratio of the pixel in the first region 102, or close to (e.g., in a range of higher than or equal to −15% and lower than or equal to 15%, preferably higher than or equal to −10% and lower than or equal to 10%) the value.

In the case where the pixel includes sub-pixels displaying a plurality of colors, a value of the aperture ratio of each of the sub-pixels may be set to the above-described value, or the aperture ratios of the sub-pixels may be set individually depending on the transmittance of the region 110 with respect to the wavelength of light emitted from each sub-pixel. For example, in the case where the pixel includes sub-pixels displaying a red color (R), a green color (G), and a blue color (B) (a sub-pixel R, a sub-pixel G, and a sub-pixel B), and the transmittance of the region 110 with respect to red light (e.g., light with a wavelength of 700 nm) is assumed to be $T_R$, the aperture ratio of the sub-pixel R in the second region 103 may be a value of $1/T_R$ times as large as the aperture ratio of the sub-pixel R in the first region 102, or close to the value. The same can apply to the sub-pixel G and the sub-pixel B.

In particular, visible light with a shorter wavelength tends to be absorbed more easily. Therefore, the aperture ratio of a sub-pixel emitting light with a short wavelength is preferably set to higher than the aperture ratio of a sub-pixel emitting light with a wavelength longer than that. For example, in three sub-pixels provided in the second region 103, the sub-pixel B displaying a blue color preferably has the aperture ratio higher than the aperture ratios of the other sub-pixels.

In FIG. 1B, all the three display panels 100 are the same. In this case, the second region 103c in which an aperture ratio is high is visually recognized in the display panel 100c placed on the uppermost side. Therefore, when an image or the like is displayed on the display region 11 of the display device 10, part of the display region 11 has high luminance in some cases.

To prevent this, the luminance of the second region 103 is preferably reduced in the case where the second region 103 in which an aperture ratio is high is not overlapped by a region 110 of another display panel 100. For example, a light-transmitting component whose transmittance is the same as that of the region 110 can be placed to overlap the display surface side of the second region 103. At this time, the light-transmitting component may have a film-like shape or a plate-like shape. As the light-transmitting component, it is preferable to use a component obtained in the following manner, for example: in manufacturing the display panel 100, a component having a stacked-layer structure similar to that of the region 110 is formed over the same substrate through a similar process and separated.

Alternatively, image processing for correcting the gray level of an image to be displayed may be performed only on the second region 103 to reduce the luminance of the second region 103. The maximum luminance of the second region 103 is higher than the maximum luminance of the first region 102. Therefore, image processing for lowering the gray level can correct the gray level so that the first region 102 and the second region 103 can have the same luminance.

Alternatively, for example, a component having a light-blocking property is provided to overlap with the second region 103 so that an image displayed on the second region 103 is not visually recognized, or an image is not displayed on the second region 103. Thus, the second region 103 in the display panel 100 closest to the display surface side may be excluded from the display region 11 of the display device 10.

Alternatively, two or more kinds of display panels having different pixel structures may be used and arranged so that the second region 103 in which an aperture ratio is high is not exposed. For example, the display panel 100 and a display panel 160 without the second region 103 as shown in FIG. 2A are used. The display panel 160 may be used as the display panel positioned on the uppermost side, as shown in FIG. 2B.

Although the plurality of display panels are arranged in one direction in the above description, a plurality of display panels may be arranged in both longitudinal and lateral directions.

Figure 3A:
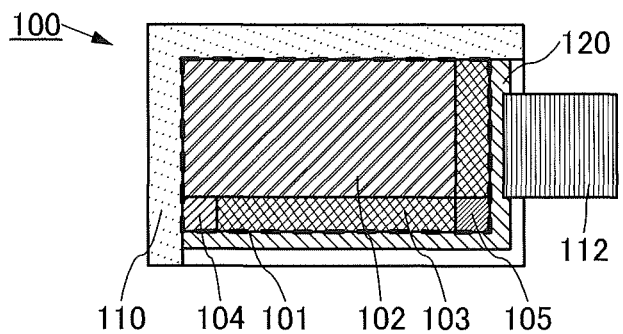
FIGS. 3A to 3C each illustrate a display device of one embodiment.

FIG. 3A shows a structure example of the display panel 100 which is partly different from that shown in FIGS. 1A and 1B and the like. The display region 101 of the display panel 100 shown in FIG. 3A includes the first region 102, the second region 103 in which an aperture ratio is higher than that in the first region 102, a third region 104 in which an aperture ratio is higher than that in the second region 103, and a fourth region 105 in which an aperture ratio is higher than that in the third region 104. The region 110 transmitting visible light is provided along two adjacent sides of the display region 101. The second region 103 is provided along two adjacent sides of four sides of the display region 101. The third region 104 and the fourth region 105 are provided at corner portions of the display region 101.

Figure 3B:
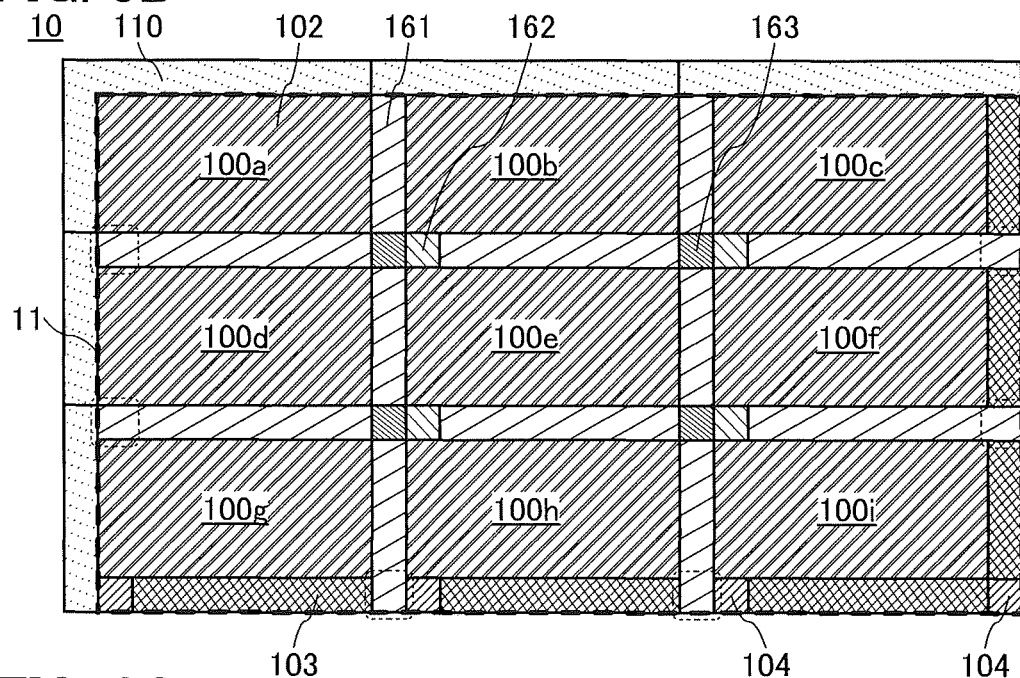

FIG. 3B shows an example of the display device 10 in which display panels 100 illustrated in FIG. 3A are arranged three by three in both longitudinal and lateral directions. The display device 10 shown in FIG. 3B includes display panels 100a to 100i. Note that in FIG. 3B, the region 120 blocking visible light, the FPC 112, and the like are omitted for simplicity, and the display region 11 and part of the region 110 transmitting visible light in the periphery of the display region 11 are shown.

The display region 11 includes portions where the display regions 101 of the display panels are exposed, a portion 161 where one of the display panels 100 overlaps the display region 101, a portion 162 where two of the display panels 100 overlap the display region 101, and a portion 163 where three of the display panels 100 overlap the display region 101.

In the portion 161, the second region 103 of the display panel 100 placed on the lower side overlaps with the region 110 transmitting visible light of the display panel 100 placed on the upper side. In the portion 162, the third region 104 of the display panel 100 placed on the lower side overlaps with the regions 110 transmitting visible light of the two display panels 100 placed on the upper side. In the portion 163, the fourth region 105 of the display panel 100 placed on the lower side overlaps with the regions 110 transmitting visible light of the three display panels 100 placed on the upper side.

In the case where the plurality of display panels 100 which are thus arranged so that the number of display panels 100 overlapping the display region 101 differs depending on a position in the display region 101, two or more kinds of pixels having different aperture ratios are preferably provided in the display region 101 so that a portion overlapped by a larger number of display panels 100 includes a pixel having a higher aperture ratio.

Furthermore, in the nine display panels included in the display device 10 shown in FIG. 3B, the display panels 100c, 100f, 100g, 100h, and 100i are placed along two sides (a side on the right side and a side on the bottom side) opposite to the display panel 100a positioned on the lowest side. The display panels 100c, 100f, 100g, 100h, and 100i each include at least one of the second region 103, the third region 104, and the fourth region 105 which is not overlapped by the region 110 of the other display panels 100. Such a portion can have luminance higher than that in the other portion when an image is displayed. To prevent this, the luminance of such a portion is preferably reduced by a method similar to that described above.

In a portion surrounded by a dashed line in FIG. 3B, the region 110 transmitting visible light of one display panel 100 overlaps the third region 104 or the fourth region 105 in which an aperture ratio is higher than that in the second region 103. Therefore, the portion can have luminance higher than that in the other portion when an image is displayed. To prevent this, the luminance of the portion is preferably reduced by a method similar to that described above.

Figure 3C:
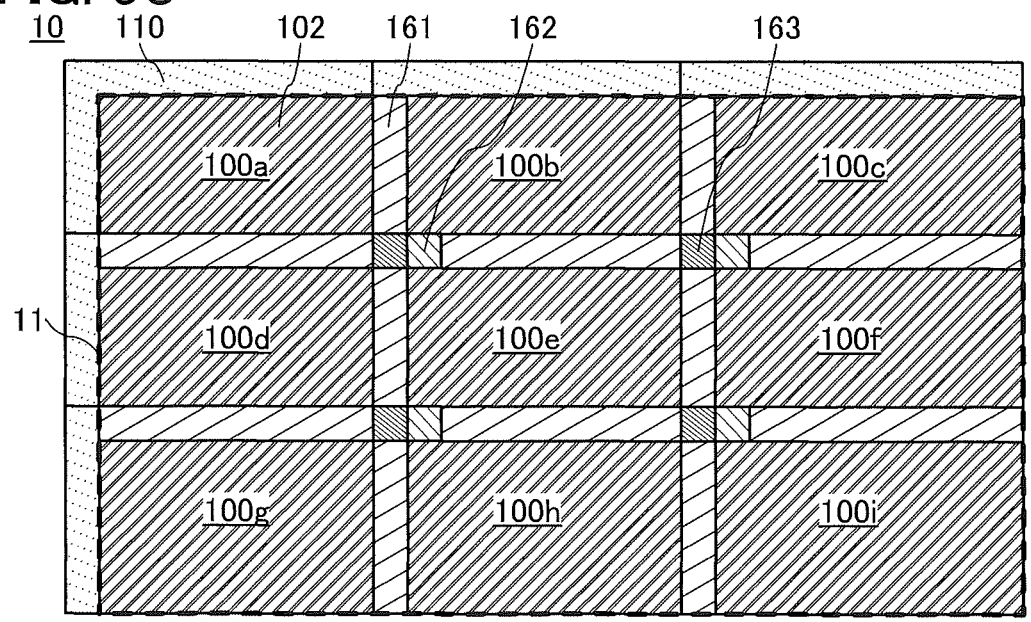

Note that all the nine display panels 100 are the same in FIG. 3B. Alternatively, two or more kinds of display panels having different pixel structures in the display regions 101 may be used and arranged so that a region in which an aperture ratio is high is not exposed. For example, FIG. 3C illustrates the case of using a total of five kinds of display panels 100. In FIG. 3C, the display panels 100a and 100d have the same structure, the display panels 100b and 100e have the same structure, the display panels 100c and 100f have the same structure, the display panels 100g and 100h have the same structure, and the display panel 100i has a structure different from those of the other display panels.

Alternatively, the position of the display panel 100 placed on the upper side may be shifted, whereby the number of display panels 100 overlapping the display regions 101 of the lower display panels 100 can be reduced.

Figure 4A:
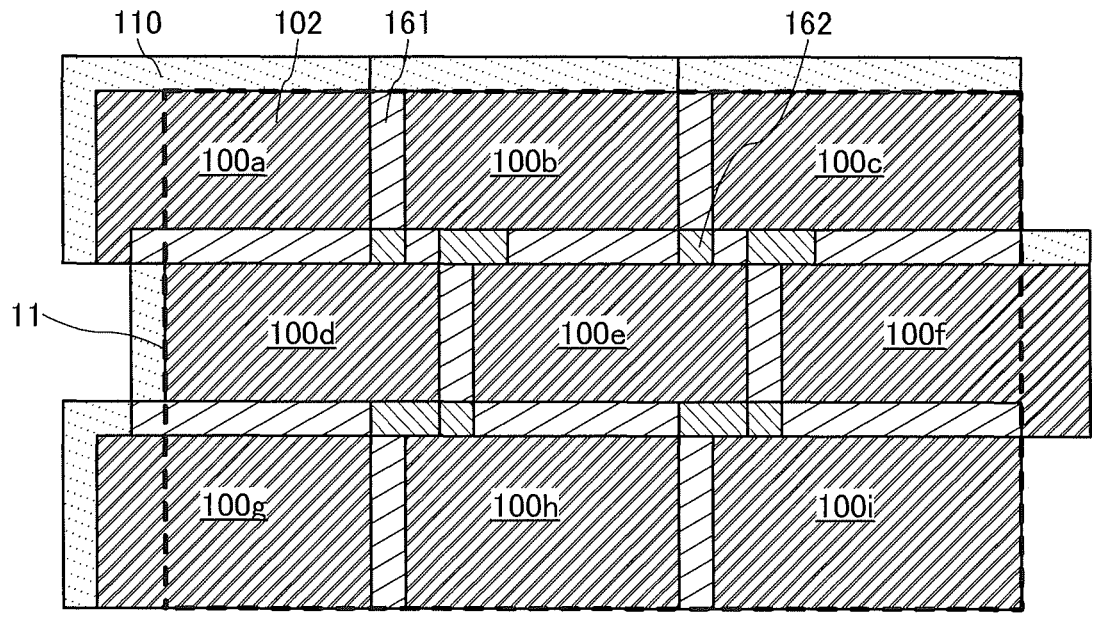
FIGS. 4A and 4B each illustrate a display device of one embodiment.

In an example shown in FIG. 4A, three display panels 100d, 100e, and 100f are shifted in a lateral direction. In this example, there are two kinds of portions: the portion 161 in which one display panel 100 overlaps the display region 101 and the portion 162 in which two display panels 100 overlap the display region 101. Therefore, the fourth region 105 described above is not necessarily formed, which increases design flexibility.

In the case where the display panel 100 placed on the upper side is shifted, the shape of the contour of a region in which the display regions 101 of the display panels 100 are combined is different from a rectangular shape. Since images generally have a rectangular shape, in the case where the shape of the display region 11 of the display device 10 is set to a rectangular shape as illustrated in FIG. 4A, driving may be performed so that no image is displayed on the display regions 101 of the display panels 100 that are placed outside the display region 11. Here, considering the number of pixels in a region where an image is not displayed, more pixels than the number obtained by dividing the number of all the pixels in the display region 11 by the number of display panels 100 may be provided in the display region 101 of the display panel 100.

Figure 4B:
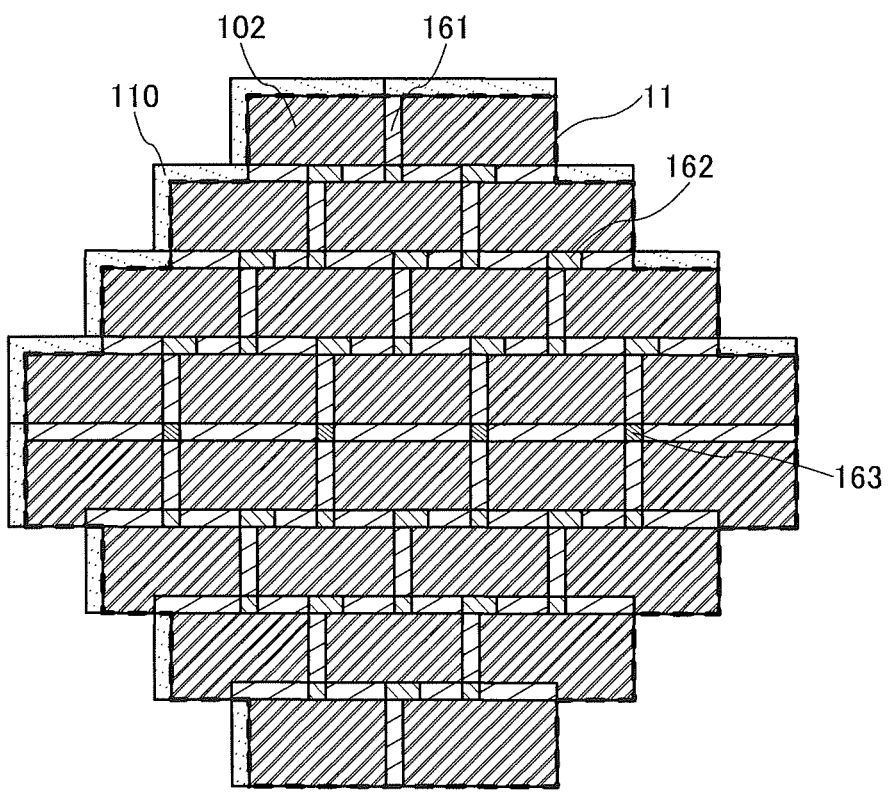

Furthermore, the display region 11 of the display device 10 can have any of a variety of shapes by changing the arrangement of a plurality of overlapping display panels 100. For example, FIG. 4B shows the display device 10 in which the display panels 100 are arranged to have the appearance of bricks so that the contour of the display region 11 has a polygonal shape.

Note that the shape of the contour of the display region 11 is not limited thereto, and may be a substantially circular shape, a substantially oval shape, a polygonal shape, a polygonal shape having a rounded corner portion, or the like. Note that in order to make the display region 11 have a shape with a curved portion in its contour (e.g., a circular shape or an oval shape), pixels are driven such that no image is displayed on a region placed outside the display region 11, or the region is covered with a light-blocking component.

[Pixel Included in Display Panel]

A pixel included in the display panel 100 is described below with reference to drawings.

Figure 5A:
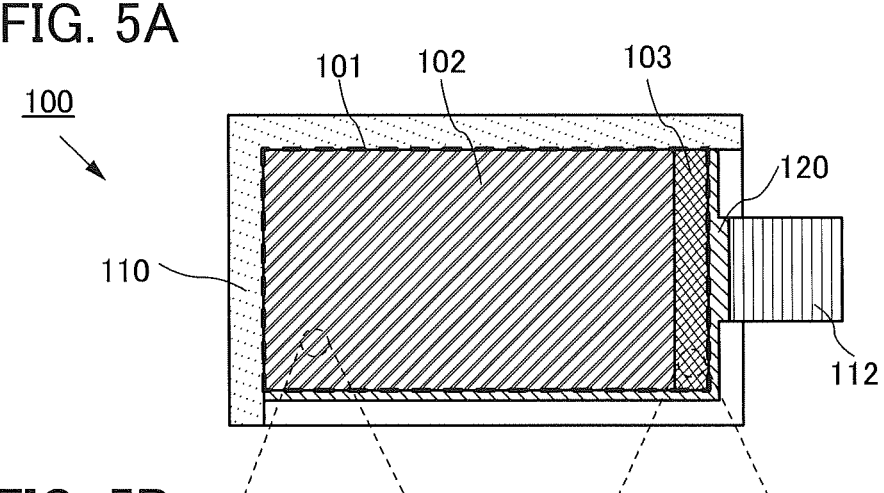
FIGS. 5A to 5C illustrate a display panel of one embodiment.

FIG. 5A is a schematic top view of the display panel 100 described below. The display panel 100 shown in FIG. 5A includes, in the display region 101, the first region 102 including a first pixel 172 and the second region 103 including a second pixel 173 having an aperture ratio higher than that of the first pixel 172.

Figure 5B:
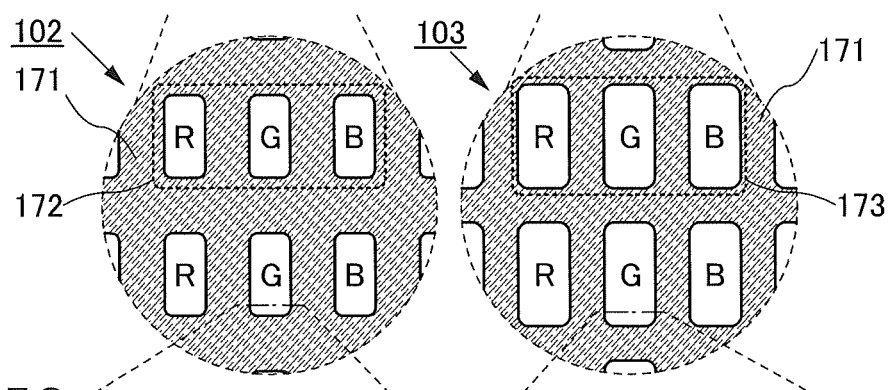

FIG. 5B is a schematic enlarged view of the first region 102 and the second region 103 when seen from the display surface side.

The first region 102 includes the first pixel 172. The second region 103 includes the second pixel 173. The first pixel 172 and the second pixel 173 each include the sub-pixel R, the sub-pixel G, and the sub-pixel B. The sub-pixel R is typically a pixel displaying a red color. The sub-pixel G is typically a pixel displaying a green color. The sub-pixel B is typically a pixel displaying a blue color. A light-blocking layer 171 having openings in regions overlapping with the sub-pixels is provided. As shown in FIG. 5B, the size of each sub-pixel in the second pixel 173 is larger than the size of each sub-pixel in the first pixel 172.

Figure 5C:
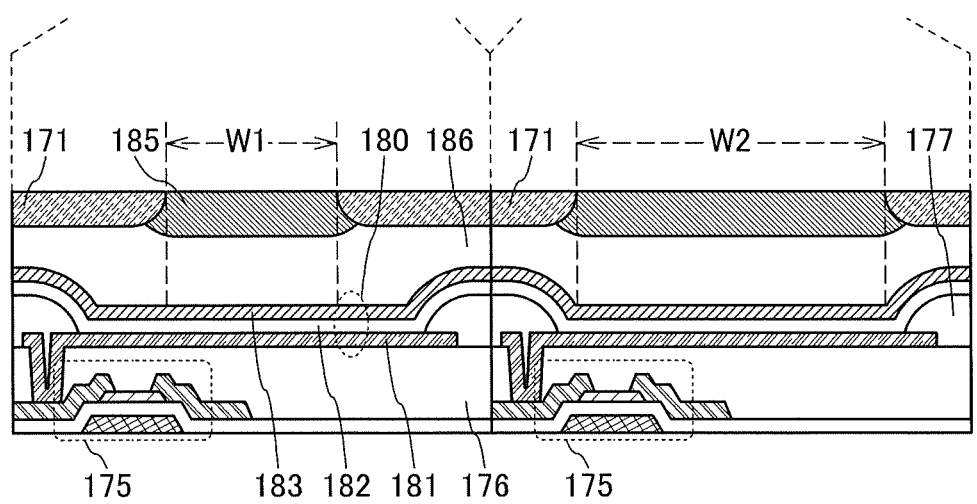

FIG. 5C is a schematic cross-sectional view of one sub-pixel in the first pixel 172 and one sub-pixel in the second pixel 173.

Each sub-pixel shown in FIG. 5C includes a transistor 175, an insulating layer 176, an insulating layer 177, a light-emitting element 180, the light-blocking layer 171, a coloring layer 185, and a sealing layer 186. The light-emitting element 180 includes an electrode 181 having a reflecting property, an electrode 183 having a light-transmitting property, and an EL layer 182 containing a light-emitting organic compound between the electrode 181 and the electrode 183. The electrode 181 is electrically connected to one of a source and a drain of the transistor 175 through an opening provided in the insulating layer 176. The insulating layer 177 is provided to cover an end portion of the electrode 181 and has an opening at a position overlapping with the electrode 181. The size of the opening in the insulating layer 177 over the electrode 181 is substantially the same as the size of the light-emitting element 180.

In FIG. 5C, the size of the opening in the light-blocking layer 171 in the sub-pixel of the first pixel 172 is different from the size of the opening in the light-blocking layer 171 in the sub-pixel of the second pixel 173. That is, in the sub-pixel of the first pixel 172, part of the light-blocking layer 171 covers part of the light-emitting element 180. In such a structure, portions other than the light-blocking layer 171 can be shared, which increases design flexibility. Furthermore, by changing only a photomask for forming the light-blocking layer 171, a display panel having different pixel structures as described above can be manufactured.

In the cross section shown in FIG. 5C, a width W2 of the opening in the light-blocking layer 171 that overlaps with the sub-pixel of the second pixel 173 is larger than a width W1 of the opening in the light-blocking layer 171 that overlaps with the sub-pixel of the first pixel 172. In FIG. 5B, the shapes of the sub-pixels (here, the shapes of the openings in the light-blocking layer 171) in the second pixel 173 are obtained by enlarging the lateral and longitudinal widths of the sub-pixels in the first pixel 172 in approximately the same proportion. However, the shapes of the sub-pixels are not limited thereto. The sub-pixel may have any shape as long as the widths of the sub-pixels (e.g., the widths of the openings in the light-blocking layer 171) are different from each other in at least an arbitrary cross section. For example, a sub-pixel in one pixel may have a shape in which the shape of a sub-pixel in the other pixel is enlarged or reduced in one direction.

In the example shown here, the three sub-pixels in the pixel have the same size, but the sub-pixels are not limited thereto. The sizes of the sub-pixels (e.g., the sizes of the light-emitting elements 180) may be different from each other. Furthermore, in the example shown here, the three sub-pixels in one of the first region 102 and the second region 103 have shapes in which the shapes of the three sub-pixels in the other are enlarged or reduced in the same proportion, but the shapes of the three sub-pixels may be enlarged or reduced in different proportions.

Light emitted from the sub-pixels is described. Since the transistor 175 and the light-emitting element 180 are connected in series, a current that flows between the source and the drain of the transistor 175 flows through the light-emitting element 180. The light-emitting element 180 supplied with a given amount of current emits light with a given luminance. In the first pixel 172, part of the light-emitting element 180 is covered by the light-blocking layer 171, and therefore, part of light travelling in straight lines from the light-emitting element 180 toward the display surface side is blocked by the light-blocking layer 171. In the second pixel 173, most of light travelling in straight lines from the light-emitting element 180 toward the display surface side is emitted to the display surface side. Therefore, the intensity of light emitted from the sub-pixel in the second pixel 173 is higher than the intensity of light emitted from the sub-pixel in the first pixel 172 even when the sub-pixels are driven by the same amount of current. This enables a circuit for driving pixels (including the transistors 175) to be shared.

Figure 6:
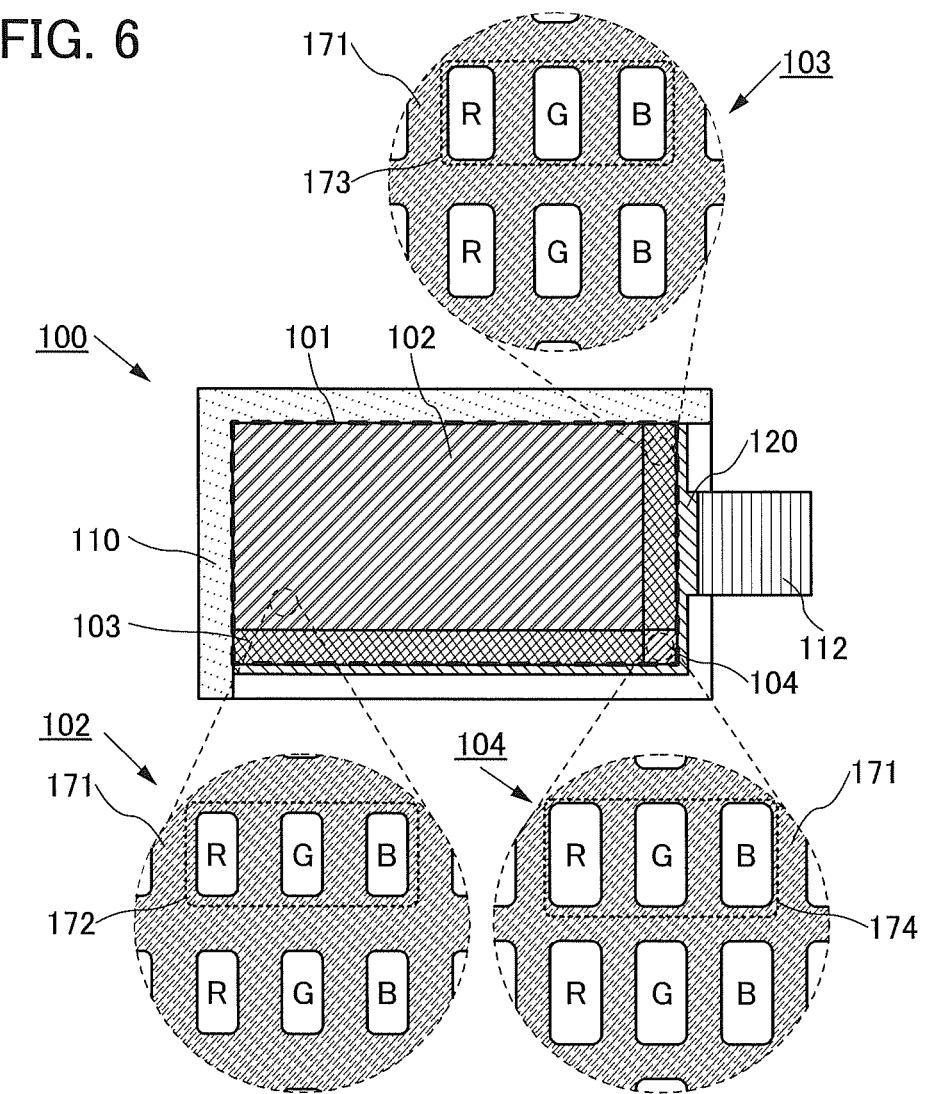
FIG. 6 illustrates a display panel of one embodiment.

In the example shown here, two regions (the first region 102 and the second region 103) are provided in the display region 101 of the display panel 100, but three or more regions differing in aperture ratio may be provided as described above. For example, FIG. 6 shows a structure including the first region 102 having the first pixel 172, the second region 103 having the second pixel 173 with an aperture ratio higher than that of the first pixel 172, and the third region 104 having the third pixel 174 with an aperture ratio higher than that of the second pixel 173.

The structure of the pixel provided in each region of the display region 101 may be any of a variety of structures without being limited to those described above.

Figure 7A:
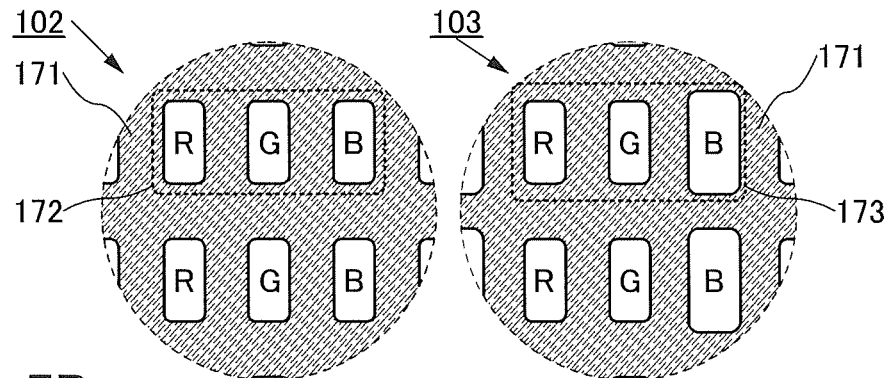
FIGS. 7A to 7D each illustrate a display panel of one embodiment.

FIG. 7A shows a structure in which, in the sub-pixels of the pixel 173 in the second region 103, only the sub-pixel B is larger than the sub-pixel of the pixel 172 in the first region 102. In this manner, the aperture ratio of only a given sub-pixel may be changed.

Figure 7B:
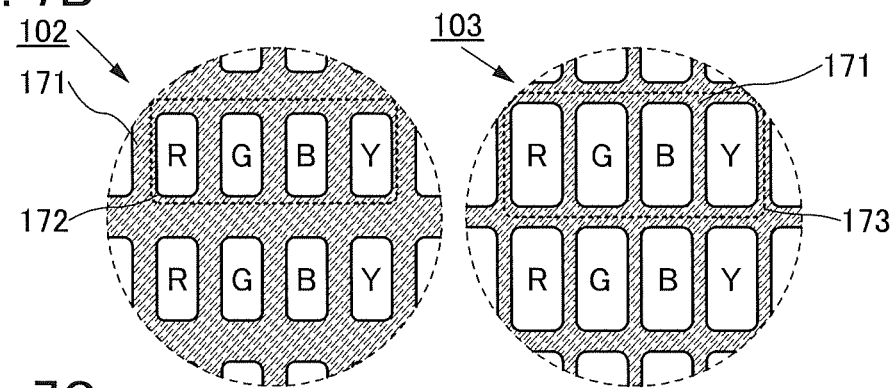
Figure 7C:
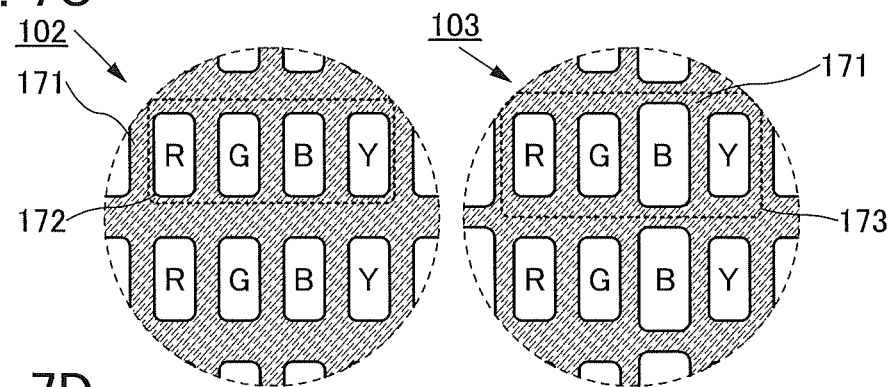

FIGS. 7B and 7C illustrate the cases where each pixel includes a sub-pixel Y in addition to the sub-pixel R, the sub-pixel G, and the sub-pixel B. The sub-pixel Y is typically a pixel displaying a yellow color. Such a structure including sub-pixels displaying four or more colors can achieve low power consumption. Note that a sub-pixel W displaying a white color may be used instead of the sub-pixel Y, or a pixel including sub-pixels displaying five colors where the sub-pixel W is added to the structure may be used.

Figure 7D:
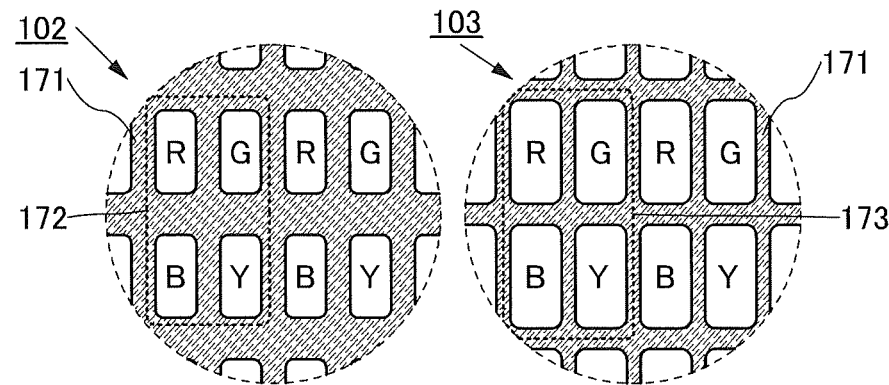

In FIGS. 7A to 7C, FIGS. 5A to 5C, FIG. 6, and the like, the sub-pixels R, G, B, and Y have a stripe arrangement. However, the sub-pixels are not limited to the arrangement. For example, in FIG. 7D, the sub-pixels R and the sub-pixels G are alternated in one direction and the sub-pixels B and the sub-pixels Y are alternated in one direction.

Next, a cross-sectional structure is described. In FIG. 5C, the size of the light-blocking layer 171 is changed to form pixels having different aperture ratios, but another method may be employed to form pixels having different aperture ratios.

Figure 8A:
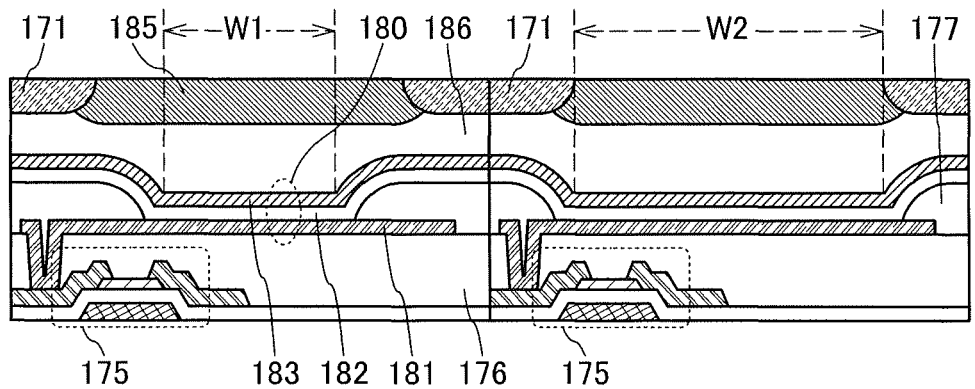
FIGS. 8A to 8C each illustrate a display panel of one embodiment.

In FIG. 8A, schematic cross-sectional views of two sub-pixels having different aperture ratios are shown in a manner similar to that of FIG. 5C. In an example shown in FIG. 8A, two sub-pixels having different aperture ratios are obtained by making the two sub-pixels differ in the size of the opening in the insulating layer 177, not by making the two sub-pixels differ in the size of the light-blocking layer 171. Also in the case of using such a structure, a display panel having different pixel structures can be manufactured by changing only a photomask for forming the insulating layer 177.

Note that in the structure shown in FIG. 8A, the areas of the light-emitting elements 180 are different from each other; therefore, when the same amount of current is supplied to the light-emitting elements 180, the light-emitting elements 180 have different current densities. As a result, when driving is performed using the same amount of current, the light-emitting element 180 in the sub-pixel having a lower aperture ratio emits light with higher luminance in some cases. To prevent this, it is preferable to perform driving so that the current densities in the light-emitting elements 180 are equal to each other in two sub-pixels having different aperture ratios.

Figure 8B:
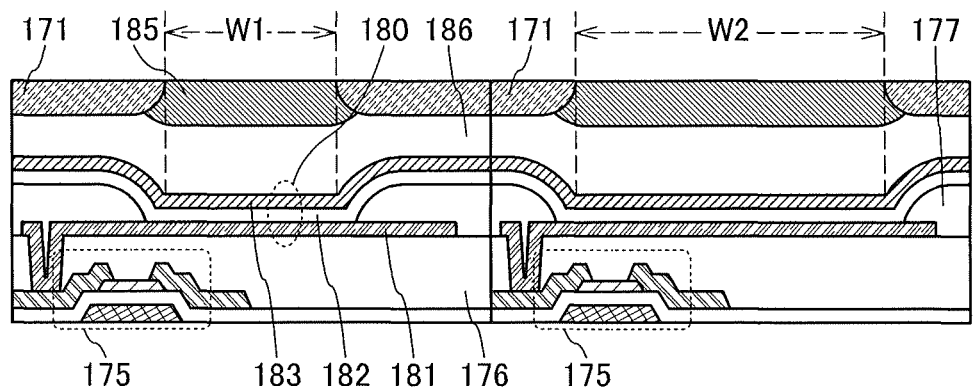

As shown in FIG. 8B, sub-pixels having different aperture ratios may be obtained by making the sub-pixels differ in both the size of the opening in the insulating layer 177 and the size of the opening in the light-blocking layer 171. Such a structure enables sub-pixels having different aperture ratios to exhibit the same viewing angle dependence.

In the structures shown in FIG. 5C and FIGS. 8A and 8B, a light-emitting element emitting white light (e.g., light having two or more peaks in a wavelength range of 450 nm to 700 nm or light having intensity in a wavelength range of 450 nm to 700 nm) is preferably used mainly as the light-emitting element 180. White light emitted from the light-emitting element 180 is transmitted through the coloring layer 185, whereby light of a specific color is extracted. When the coloring layers 185 of different colors are provided in the sub-pixels, the display panel 100 can achieve full-color display.

Figure 8C:
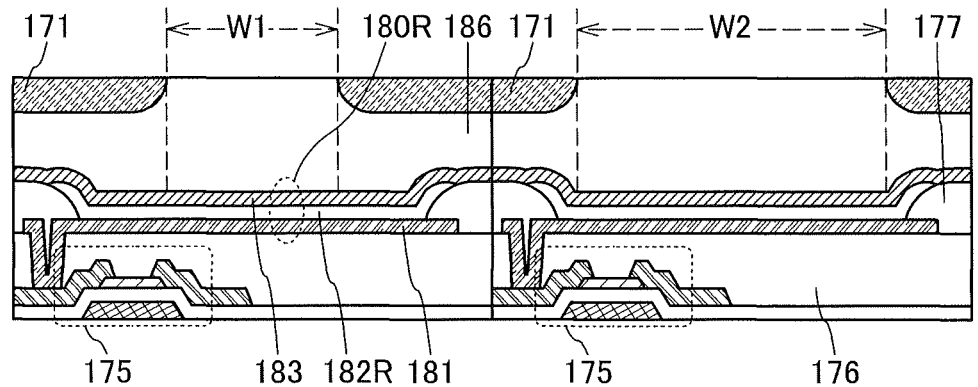

Note that the light-emitting elements emitting light of different colors may be formed in sub-pixels for different colors to achieve full-color display. FIG. 8C shows an example in which a light-emitting element 180R including an EL layer 182R emitting red light is provided in a sub-pixel. In this case, a structure without the coloring layer 185 may be employed as shown in FIG. 8C because the EL layer 182R emits red light.

Figure 9A:
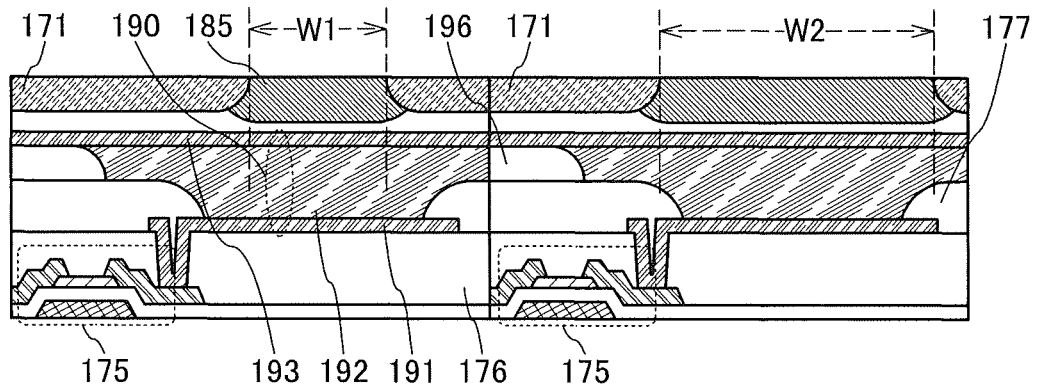
FIGS. 9A to 9C each illustrate a display panel of one embodiment.

In the above-described cases, a display element is a light-emitting element, but not limited thereto, and may be a liquid crystal element or the like. FIG. 9A shows the case of including a liquid crystal element 190 using a vertical alignment (VA) mode.

The liquid crystal element 190 included in each sub-pixel shown in FIG. 9A includes an electrode 191 electrically connected to one of the source and the drain of the transistor 175, an electrode 193, and a liquid crystal 192 between the electrode 191 and the electrode 193. Although not shown here, two polarizing plates between which the liquid crystal element 190 is provided and a light source such as a backlight may be further included. Furthermore, as shown in FIG. 9A, a spacer 196 may be provided over the insulating layer 177.

Figure 9B:
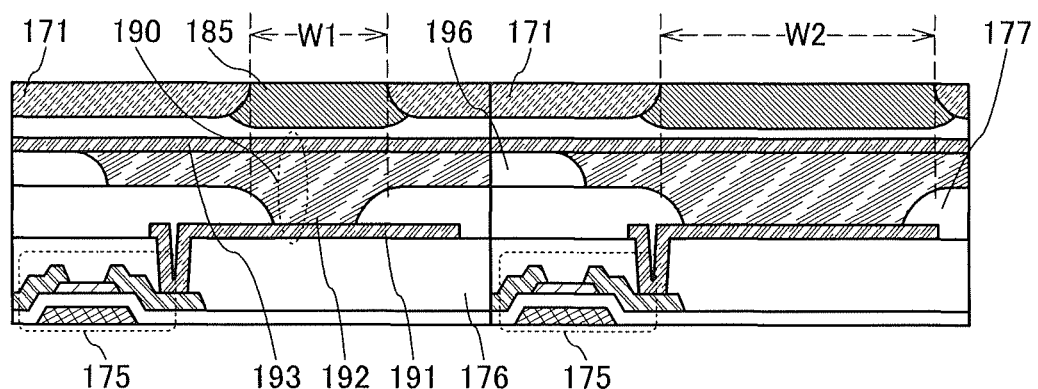

In the example shown in FIG. 9A, sub-pixels having different aperture ratios are obtained by making the sub-pixels differ in the size of the opening in the light-blocking layer 171. In the example shown in FIG. 9B, sub-pixels having different aperture ratios are obtained by making the sub-pixels differ in both the size of the opening in the light-blocking layer 171 and the size of the opening in the insulating layer 177. The orientation of liquid crystals in the liquid crystal element 190 can be controlled by electric field intensity. Therefore, even in the liquid crystal elements 190 having different areas, the orientations of liquid crystals when voltages at the same level are applied between electrodes can be substantially the same. Thus, the intensity of light transmitted through the sub-pixel can be varied depending on the size of the liquid crystal element 190 even when the sub-pixels are driven with voltages at the same level.

Figure 9C:
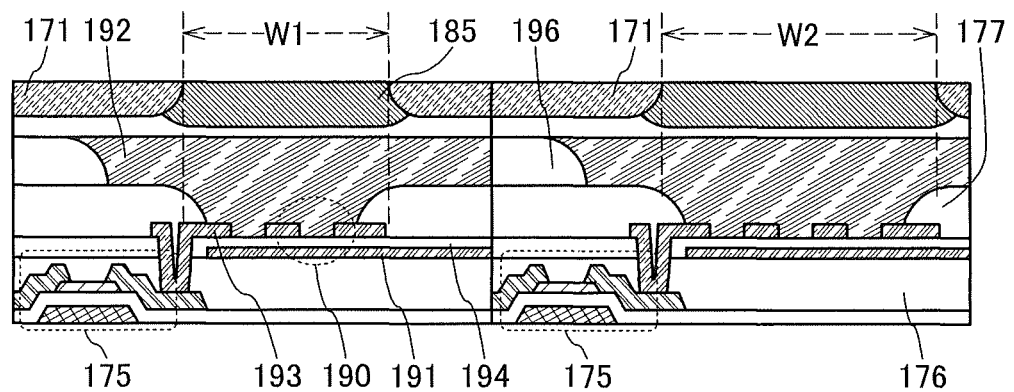

FIG. 9C shows the case where the liquid crystal element 190 using a fringe field switching (FFS) mode is included. The liquid crystal element 190 shown in FIG. 9C includes the electrode 191, the electrode 193 over the electrode 191 with an insulating layer 194 provided therebetween, and the liquid crystal 192. The electrode 193 has a comb-like shape or a shape provided with a slit. In the example shown in FIG. 9C, sub-pixels having different aperture ratios are obtained by making the sub-pixels differ in both the opening in the light-blocking layer 171 and the opening in the insulating layer 177, and differ in the shape of the electrode 193.

Although the liquid crystal element using a VA mode and the liquid crystal element using an FFS mode are described above, a twisted nematic (TN) mode, an in-plane-switching (IPS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

As the liquid crystal, a thermotropic liquid crystal, a low-molecular liquid crystal, a high-molecular liquid crystal, a ferroelectric liquid crystal, an anti-ferroelectric liquid crystal, a polymer dispersed liquid crystal (PDLC), or the like can be used. Moreover, a liquid crystal exhibiting a blue phase is preferably used because an alignment film is not needed and a wide viewing angle is obtained in that case.

[Other Configuration Examples of Display Device]

Examples of using a flexible display panel as the display panel 100 are described.

Figure 10A:
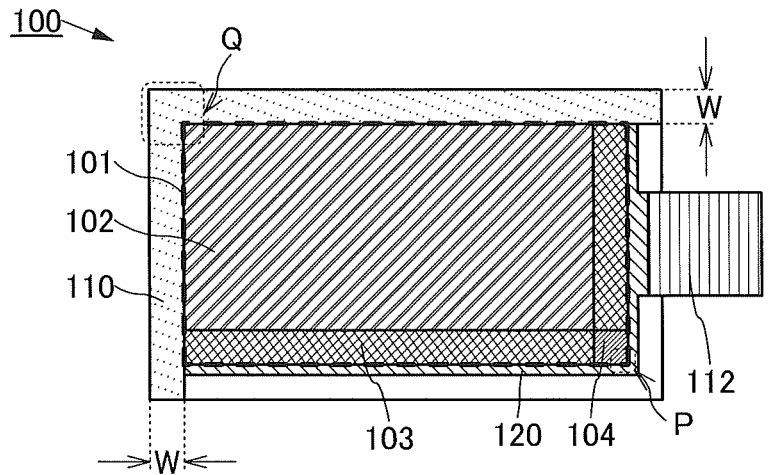
FIGS. 10A to 10C illustrate a display device of one embodiment.

FIG. 10A shows an example of the display panel 100 which can be used in a display device to be described below. The display region 101 of the display panel 100 shown in FIG. 10A includes the first region 102, the second region 103, and the third region 104.

Figure 10B:
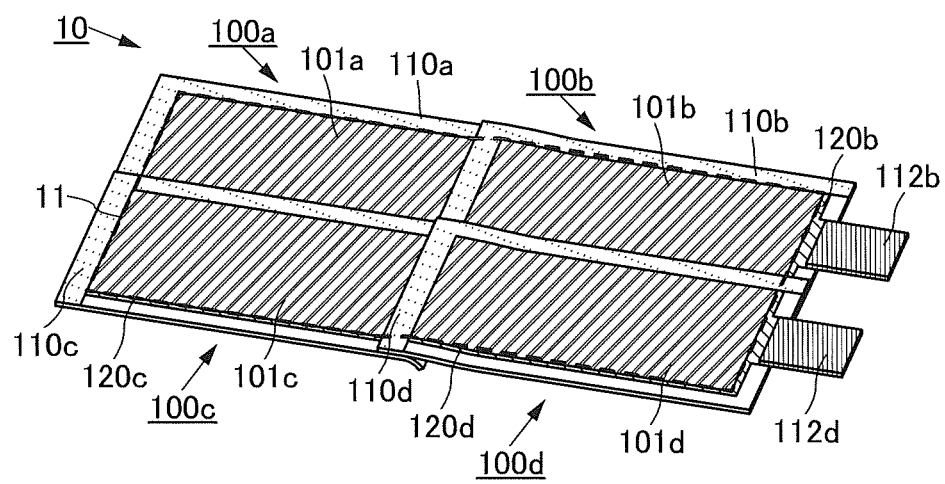
Figure 10C:
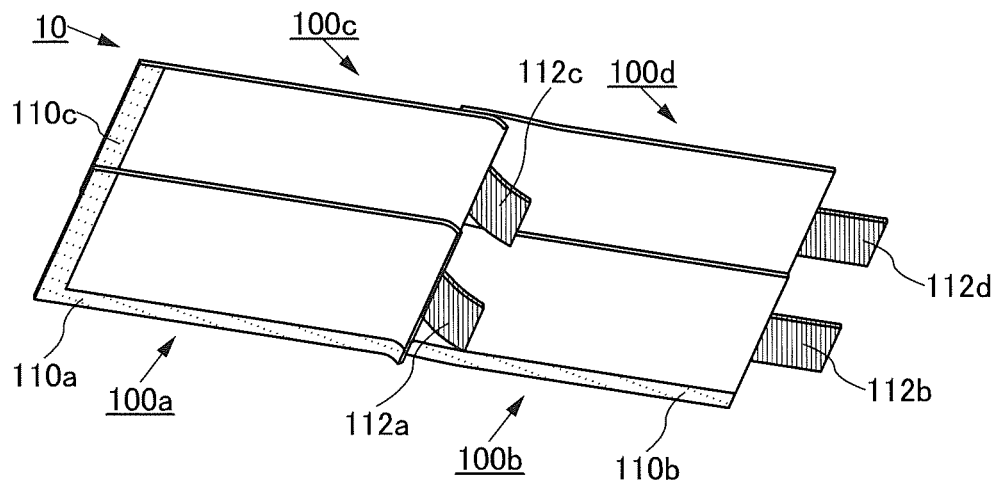

FIG. 10B is a schematic perspective view of the display device 10 in which the display panels 100 are arranged two by two in both longitudinal and lateral directions. FIG. 10C is a schematic perspective view of the display device 10 when seen from a side opposite to the display surface side. Furthermore, the display panels 100a to 100d, the display regions 101a to 101c, a display region 101d, the regions 110a to 110c, a region 110d, the regions 120b and 120c, a region 120d, FPCs 112a, 112b, and 112d, the FPC 112c, and the like are shown in FIGS. 10B and 10C.

In FIGS. 10B and 10C, part of the region 110b of the display panel 100b and a region along a short side of the display region 101a of the display panel 100a overlap with each other. In addition, part of the region 110c of the display panel 100c and a region along a long side of the display region 101a of the display panel 100a overlap with each other. Moreover, a region 110d of a display panel 100d overlaps both a region along a long side of the display region 101b of the display panel 100b and a region along a short side of the display region 101c of the display panel 100c.

Therefore, as illustrated in FIG. 10B, a region where the display regions 101a to 101d are placed seamlessly can serve as the display region 11 of the display device 10. Note that FIG. 10B shows the case where display panels including different pixel structures are used as the display panels 100a to 100d and arranged so that a region having a high aperture ratio is not exposed.

Here, it is preferable that a flexible material be used for the pair of substrates included in the display panel 100 and the display panel 100 have flexibility. Thus, as in the display panel 100a shown in FIGS. 10B and 10C, a region near an FPC 112a of the display panel 100a can be bent so that part of the display panel 100a and part of the FPC 112a can be placed under the display region 101b of the display panel 100b. As a result, the FPC 112a can be placed without physical interference with the rear surface of the display panel 100b. Furthermore, when the display panel 100a and the display panel 100b overlap and are fixed to each other, it is not necessary to consider the thickness of the FPC 112a; thus, the difference in height between the top surface of the region 110*b* of the display panel 100*b* and the top surface of the display panel 100*a* can be reduced. This can make an end portion of the display panel 100*b* over the display region 101*a* less noticeable.

Moreover, each display panel 100 has flexibility, whereby the display panel 100*b* can be curved gently so that the top surface of the display region 101*b* of the display panel 100*b* and the top surface of the display region 101*a* of the display panel 100*a* are equal to each other in height. Thus, the heights of the display regions can be equal to each other except in the vicinity of the region where the display panel 100*a* and the display panel 100*b* overlap each other, so that the display quality of an image displayed on the display region 11 of the display device 10 can be improved.

The relation between the display panel 100*a* and the display panel 100*b* is taken as an example in the above description, and the same can apply to the relation between any two adjacent display panels (e.g., between the display panel 100*c* and the display panel 100*d*).

Furthermore, to reduce the step between two adjacent display panels 100, the thickness of the display panel 100 is preferably small. For example, the thickness of the display panel 100 is preferably less than or equal to 1 mm, further preferably less than or equal to 300 μm, still further preferably less than or equal to 100 μm.

Figure 11A:
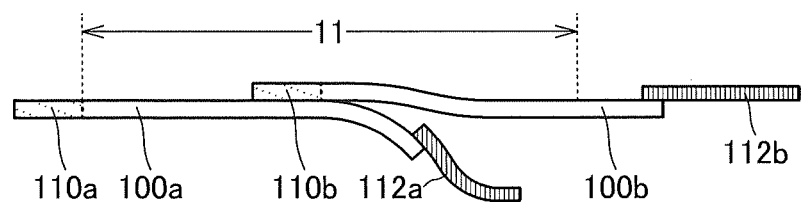
FIGS. 11A to 11D each illustrate a display device of one embodiment.

FIG. 11A is a schematic cross-sectional view when the two display panels 100 are bonded to each other. In an example shown in FIG. 11A, the FPC 112*a* and an FPC 112*b* are connected to the display surface side of the display panel 100*a* and the display surface side of the display panel 100*b*, respectively.

Figure 11B:
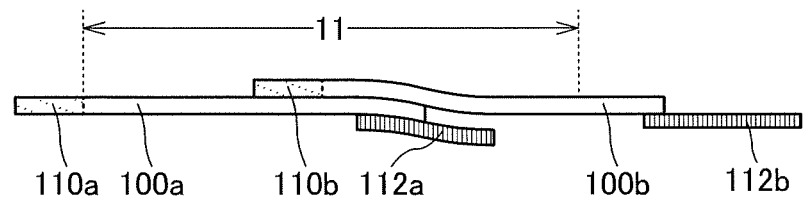

Alternatively, as illustrated in FIG. 11B, the FPC 112*a* and the FPC 112*b* may be connected to the side opposite to the display surface side of the display panel 100*a* and the side opposite to the display surface side of the display panel 100*b*, respectively. In this structure, the end portion of the display panel 100*a* positioned on the lower side can be attached to the rear surface of the display panel 100*b*; thus, the attachment area can be increased and the mechanical strength of the attached portion can be increased.

Figure 11C:
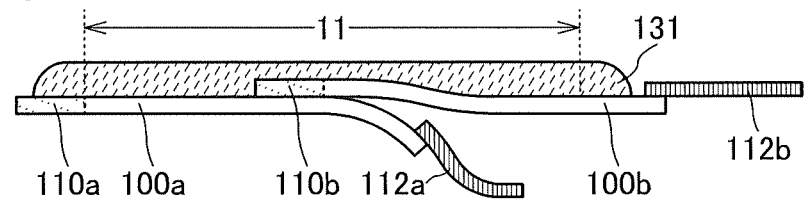
Figure 11D:
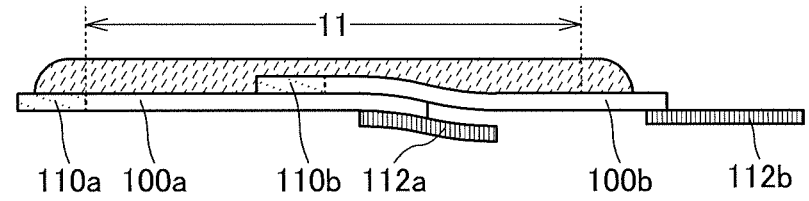

Alternatively, as illustrated in FIGS. 11C and 11D, a light-transmitting resin layer 131 may be provided to cover the top surfaces of the display panel 100*a* and the display panel 100*b*. Specifically, the resin layer 131 is preferably provided to cover the display regions of the display panels 100*a* and 100*b* and a region where the display panel 100*a* and the display panel 100*b* overlap.

By providing the resin layer 131 over the plurality of display panels 100, the mechanical strength of the display device 10 can be increased. In addition, the resin layer 131 is formed to have a flat surface, whereby the display quality of an image displayed on the display region 11 can be increased. For example, when a coating apparatus such as a slit coater, a curtain coater, a gravure coater, a roll coater, or a spin coater is used, the resin layer 131 with high flatness can be formed.

Furthermore, a difference in refractive index between the resin layer 131 and the substrate on the display surface side of the display panel 100 is preferably less than or equal to 20%, further preferably less than or equal to 10%, still further preferably less than or equal to 5%. By using the resin layer 131 having such a refractive index, light can be efficiently extracted outside. In addition, the resin layer 131 with such a refractive index is provided to cover a step portion between the display panel 100*a* and the display panel 100*b*, whereby the step portion is not easily recognized visually, and the display quality of an image displayed on the display region 11 of the display device can be increased.

As a material used for the resin layer 131, for example, an organic resin such as an epoxy resin, an aramid resin, an acrylic resin, a polyimide resin, a polyamide resin, or a polyamide-imide resin can be used.

Figure 12A:
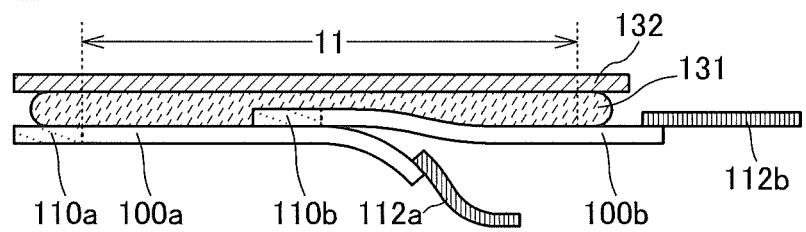
FIGS. 12A to 12D each illustrate a display device of one embodiment.
Figure 12B:
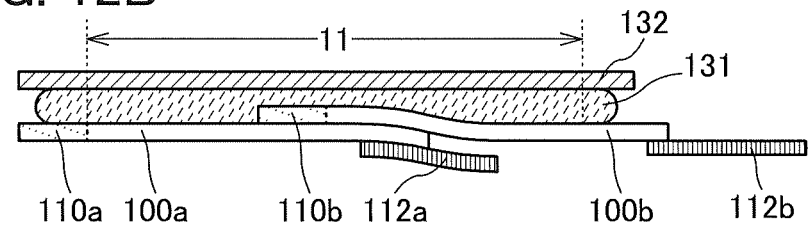

Alternatively, as illustrated in FIGS. 12A and 12B, a protective substrate 132 is preferably provided over the display device 10 with the resin layer 131 provided therebetween. Here, the resin layer 131 may serve as a bonding layer for bonding the protective substrate 132 to the display device 10. With the protective substrate 132, the surface of the display device 10 can be protected, and moreover, the mechanical strength of the display device 10 can be increased. For the protective substrate 132 in a region overlapping at least the display region 11, a light-transmitting material is used. Furthermore, the protective substrate 132 in a region other than the region overlapping the display region 11 may have a light-blocking property not to be visually recognized.

The protective substrate 132 may have a function of a touch panel. In the case where the display panel 100 is flexible and can be bent, the protective substrate 132 is also preferably flexible.

Furthermore, a difference in refractive index between the protective substrate 132 and the substrate on the display surface side of the display panel 100 or the resin layer 131 is preferably less than or equal to 20%, further preferably less than or equal to 10%, still further preferably less than or equal to 5%.

As the protective substrate 132, a plastic substrate that is formed as a film, for example, a plastic substrate made from polyimide (PI), an aramid, polyethylene terephthalate (PET), polyethersulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), a silicone resin, and the like can be used. The protective substrate 132 is preferably flexible. The protective substrate 132 includes a fiber or the like (e.g., a prepreg). Furthermore, a base material is not limited to the resin film, and a transparent nonwoven fabric formed by processing pulp into a continuous sheet, a sheet including an artificial spider's thread fiber containing protein called fibroin, a complex in which the transparent nonwoven fabric or the sheet and a resin are mixed, a stack of a resin film and a nonwoven fabric containing a cellulose fiber whose fiber width is 4 nm or more and 100 nm or less, or a stack of a resin film and a sheet including an artificial spider's thread fiber may be used.

Figure 12C:
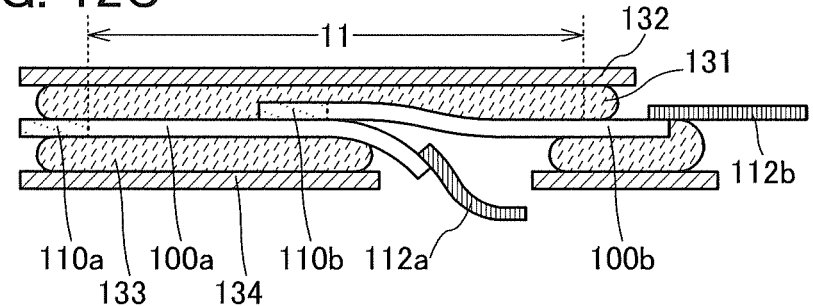
Figure 12D:
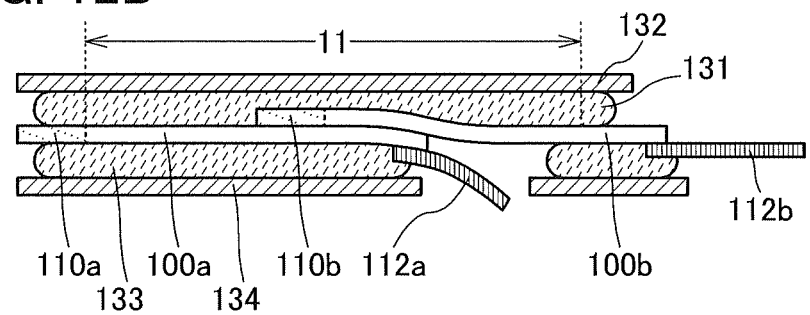

Alternatively, as illustrated in FIGS. 12C and 12D, a resin layer 133 may be provided on a surface opposite to the display surface sides of the display panel 100*a* and the display panel 100*b*, and a protective substrate 134 may be provided with the resin layer 133 provided between the protective substrate 134 and each of the display panels 100*a* and 100*b*. In this manner, the display panels 100*a* and 100*b* are sandwiched between the two protective substrates, whereby the mechanical strength of the display device 10 can be further increased. Furthermore, when the thicknesses of the resin layers 131 and 133 are substantially equal to each other, and for the protective substrates 132 and 134, materials having thicknesses which are substantially equal to each other are used, the plurality of display panels 100 can be located at the center of the stack. For example, when the stack including the display panel 100 is bent, by locating the display panel 100 at the center in the thickness direction, stress in the lateral direction applied to the display panel 100 by bending can be relieved, so that damage can be prevented.

As illustrated in FIGS. 12C and 12D, an opening portion for extracting the FPC 112a is preferably provided in the resin layer 133 and the protective substrate 134, which are located on the rear surface sides of the display panels 100a and 100b. At this time, by providing the resin layer 133 to cover part of the FPC 112a, the mechanical strength at a connection portion between the display panel 100a and the FPC 112a can be increased, and defects such as peeling of the FPC 112a can be suppressed. Similarly, the resin layer 133 is preferably provided to cover part of the FPC 112b.

Note that the resin layer 133 and the protective substrate 134, which are provided on the side opposite to the display surface side, do not necessarily have a light-transmitting property, and a material which absorbs or reflects visible light may be used. When the resin layers 133 and 131, or the protective substrates 134 and 132 have the same materials, manufacturing cost can be reduced.

[Structure Examples of Region Transmitting Visible Light and Region Blocking Visible Light]

Next, structure examples of the region 110 transmitting visible light of the display panel 100, the vicinity of the region 110, the region 120 blocking visible light, and the vicinity of the region 120 are described.

Figure 13A:
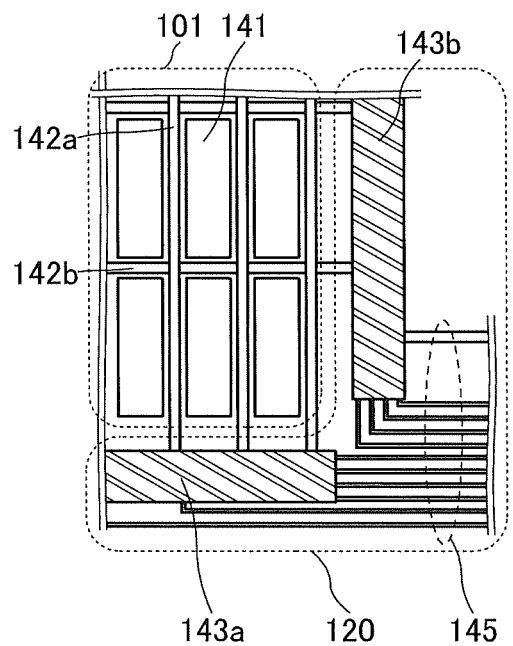
FIGS. 13A to 13C illustrate a display panel of one embodiment.
Figure 13B:
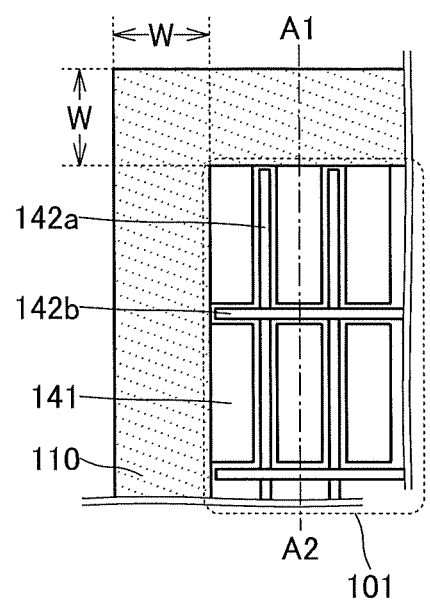

FIG. 13A is a schematic top view in which a region P in FIG. 10A is enlarged, and FIG. 13B is a schematic top view in which a region Q in FIG. 10A is enlarged.

As illustrated in FIG. 13A, in the display region 101, a plurality of pixels 141 are arranged in matrix. In the case where the display panel 100 capable of full color display with three colors of red, blue, and green is formed, the pixel 141 corresponds to a sub-pixel capable of displaying any of the three colors. Alternatively, a pixel capable of displaying white or yellow in addition to the three colors may be provided. A region including the pixels 141 corresponds to the display region 101.

A wiring 142a and a wiring 142b are electrically connected to one pixel 141. The plurality of wirings 142a each intersect with the wiring 142b, and is electrically connected to a circuit 143a. The plurality of wirings 142b is electrically connected to a circuit 143b. One of the circuits 143a and 143b can function as a scan line driver circuit, and the other can function as a signal line driver circuit. A structure without one of the circuits 143a and 143b or both of them may be employed.

In FIG. 13A, a plurality of wirings 145 electrically connected to the circuit 143a or the circuit 143b is provided. The wiring 145 is electrically connected to the FPC 112 in an unillustrated region and has a function of supplying a signal from the outside to the circuits 143a and 143b.

In FIG. 13A, a region including the circuit 143a, the circuit 143b, the plurality of wirings 145, and the like corresponds to the region 120 blocking visible light.

In FIG. 13B, a region outside the pixel 141 provided closest to the end corresponds to the region 110 transmitting visible light. The region 110 does not include the members blocking visible light, such as the pixel 141, the wiring 142a, and the wiring 142b. Note that in the case where part of the pixel 141, the wiring 142a, or the wiring 142b transmits visible light, the part of the pixel 141, the wiring 142a, or the wiring 142b may be provided to extend to the region 110.

Here, the width W of the region 110 indicates the narrowest width of the region 110 provided in the display panel 100 in some cases. In the case where the width W of the region 110 varies depending on the positions, the shortest length can be referred to as the width W. In FIG. 13B, the distance between the pixel 141 and the end surface of the substrate (that is, the width W of the region 110) in the longitudinal direction is the same as that in the lateral direction.

Figure 13C:
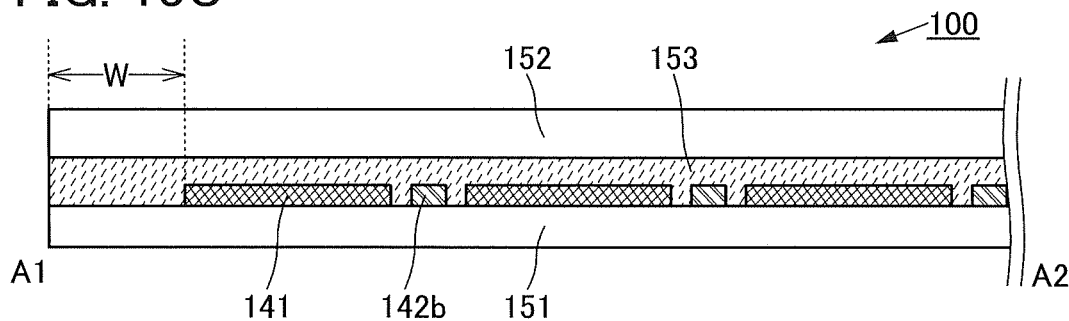

FIG. 13C is a schematic cross-sectional view taken along line A1-A2 in FIG. 13B. The display panels 100 include a pair of light-transmitting substrates (a substrate 151 and a substrate 152). The substrate 151 and the substrate 152 are bonded to each other with a bonding layer 153. Here, the substrate on which the pixel 141, the wiring 142b, and the like are formed is referred to as the substrate 151.

As illustrated in FIGS. 13B and 13C, in the case where the pixel 141 is positioned closest to the end of the display region 101, the width of the region 110 transmitting visible light is the distance between the end portion of the substrate 151 or the substrate 152 and the end portion of the pixel 141.

Note that the end portion of the pixel 141 refers to the end portion of the member that is positioned closest to the end and blocks visible light in the pixel 141. In the case where a light-emitting element including a layer containing a light-emitting organic compound between a pair of electrodes (also referred to as an organic EL element) is used as the pixel 141, the end portion of the pixel 141 may be any of the end portion of the lower electrode, the end portion of the layer containing a light-emitting organic compound, and the end portion of the upper electrode.

Figure 14A:
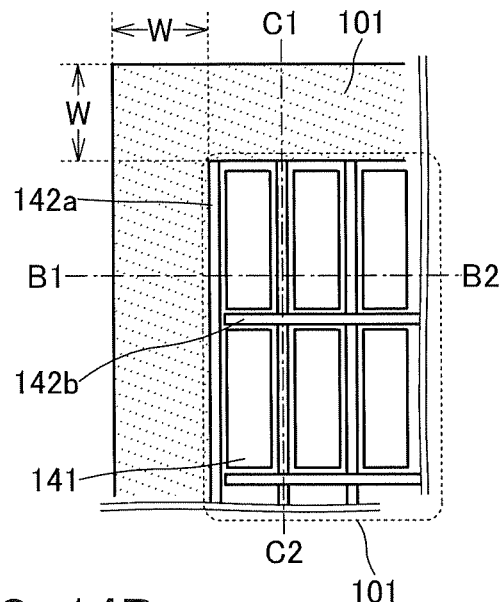
FIGS. 14A to 14C illustrate a display panel of one embodiment.
Figure 14B:
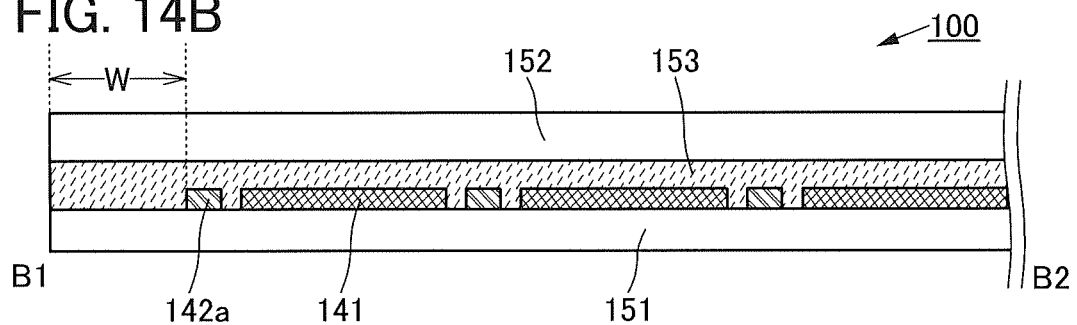

FIG. 14A shows the case where the position of the wiring 142a is different from that in FIG. 13B. FIG. 14B is a schematic cross-sectional view taken along line B1-B2 in FIG. 14A, and FIG. 14C is a schematic cross-sectional view taken along line C1-C2 in FIG. 14A.

Figure 14C:
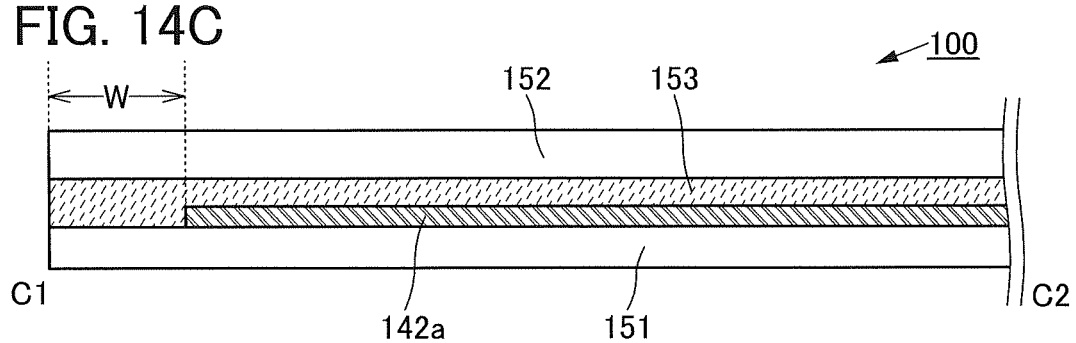

As illustrated in FIGS. 14A to 14C, in the case where the wiring 142a is positioned closest to the end of the display region 101, the width W of the region 110 transmitting visible light is the distance between the end portion of the substrate 151 or the substrate 152 and the end portion of the wiring 142a. In the case where the wiring 142a transmits visible light, the region 110 may include a region where the wiring 142a is provided.

Note that one embodiment of the present invention is not limited to the above examples. For example, in the case where the plurality of display panels 100 are arranged to partly overlap one another, the pixels having higher aperture ratios are overlapped by a larger number of display panels 100 in the above-described examples. However, the pixels do not necessarily have higher aperture ratios in some cases. For example, the pixels may have the same aperture ratio. Alternatively, the pixels may be made differ in the luminance of light emitted therefrom. For example, a pixel overlapped by a plurality of display panels is made to emit light with high luminance. This allows a viewer of the display device to see a displayed image as if a place overlapped by the display panel and a place not overlapped by the display panel emitted light of the same luminance.

At least part of this embodiment can be implemented in combination with any of the embodiments described in this specification as appropriate.

Embodiment 2

In this embodiment, a display panel which can be used in a display device of one embodiment of the present invention is described with reference to drawings. Here, as an example of the display panel, a touch panel having a function as a touch sensor is described.

Figure 15A:
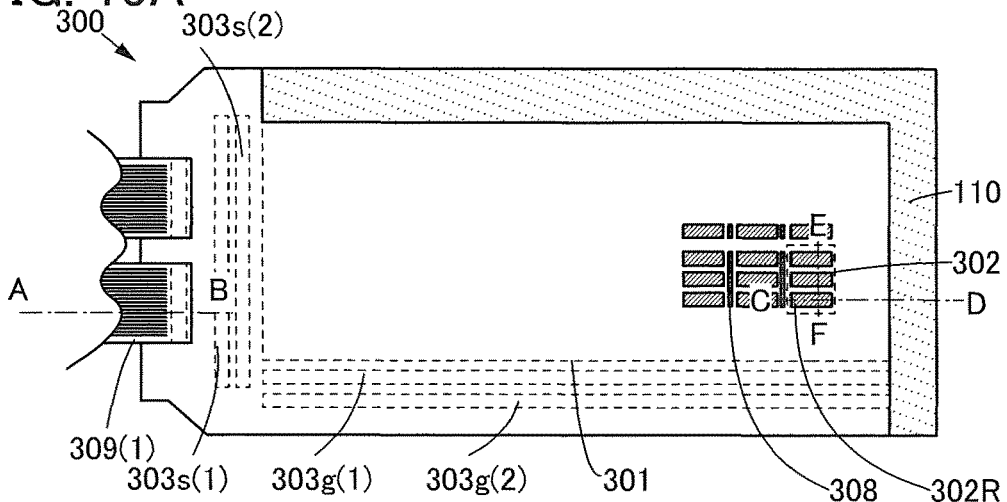
FIGS. 15A to 15C illustrate a touch panel of one embodiment.
Figure 15B:
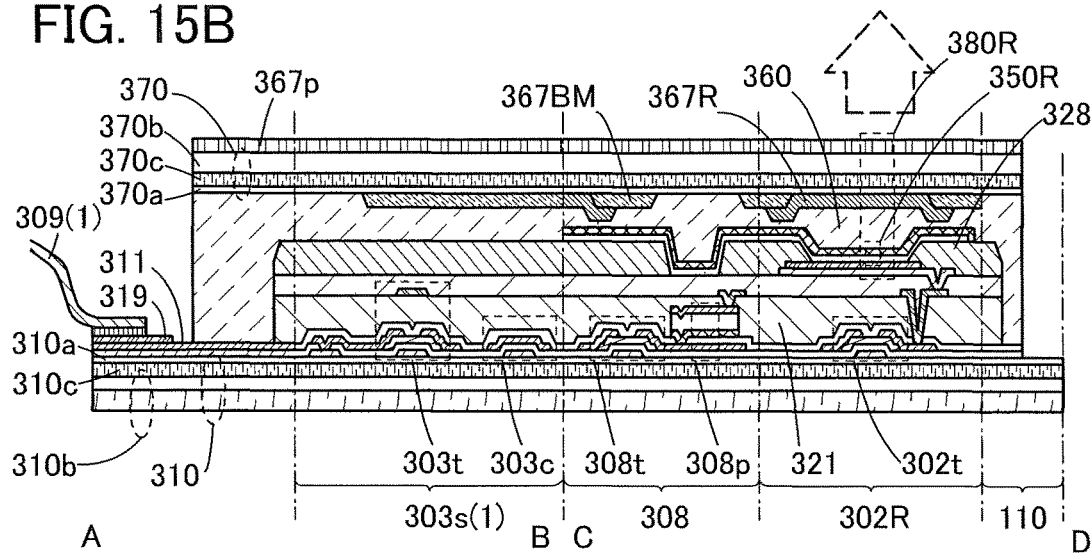
Figure 15C:
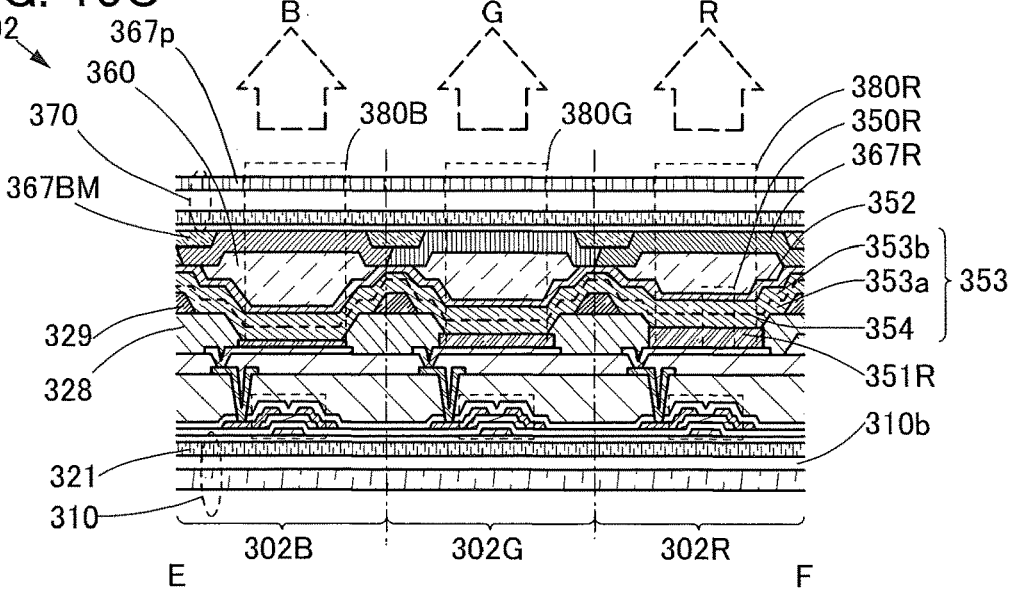

FIG. 15A is a top view illustrating a structure of a touch panel that can be used in a display device of one embodiment of the present invention. FIG. 15B is a cross-sectional view taken along line A-B and line C-D in FIG. 15A. FIG. 15C is a cross-sectional view taken along line E-F in FIG. 15A.

[Top View]

A touch panel 300 described as an example in this embodiment includes a display portion 301 (see FIG. 15A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, the sub-pixels are provided with light-emitting elements and pixel circuits that can supply electric power for driving the light-emitting elements.

The pixel circuits are electrically connected to wirings through which selection signals are supplied and wirings through which image signals are supplied.

Furthermore, the touch panel 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time taken for an imaging pixel circuit to sense light.

The touch panel 300 is provided with an imaging pixel driver circuit 303g(2) that can supply control signals to the imaging pixels 308 and an imaging signal line driver circuit 303s(2) that reads imaging signals.

The touch panel 300 includes the region 110 transmitting visible light along two sides of the display portion 301.

[Cross-Sectional View]

The touch panel 300 includes a substrate 310 and a counter substrate 370 that faces the substrate 310 (see FIG. 15B).

The substrate 310 is a stack in which a flexible substrate 310b, a barrier film 310a that prevents diffusion of impurities to the light-emitting elements, and an adhesive layer 310c that bonds the barrier film 310a to the substrate 310b are stacked.

The counter substrate 370 is a stack including a flexible substrate 370b, a barrier film 370a that prevents diffusion of impurities to the light-emitting elements, and an adhesive layer 370c that attaches the barrier film 370a to the substrate 370b (see FIG. 15B).

A sealant 360 attaches the counter substrate 370 to the substrate 310. The sealant 360 has a refractive index higher than that of air. The sealant 360 serves as a layer which optically attaches two members (here, the counter substrate 370 and the substrate 310) between which the sealant 360 is sandwiched (hereinafter also referred to as an optical adhesive layer). The pixel circuits and the light-emitting elements (e.g., a light-emitting element 350R) are provided between the substrate 310 and the counter substrate 370.

[Pixel Structure]

Each of the pixels 302 includes a sub-pixel 302R, a sub-pixel 302G, and a sub-pixel 302B (see FIG. 15C). The sub-pixel 302R includes a light-emitting module 380R, the sub-pixel 302G includes a light-emitting module 380G, and the sub-pixel 302B includes a light-emitting module 380B.

For example, the sub-pixel 302R includes the light-emitting element 350R and a pixel circuit that can supply electric power to the light-emitting element 350R and includes a transistor 302t (see FIG. 15B). The light-emitting module 380R includes the light-emitting element 350R and an optical element (e.g., a coloring layer 367R).

The light-emitting element 350R includes a lower electrode 351R, an upper electrode 352, and a layer 353 containing a light-emitting organic compound between the lower electrode 351R and the upper electrode 352 (see FIG. 15C).

The layer 353 containing a light-emitting organic compound includes a light-emitting unit 353a, a light-emitting unit 353b, and an intermediate layer 354 between the light-emitting units 353a and 353b.

The light-emitting module 380R includes the coloring layer 367R on the counter substrate 370. The coloring layer transmits light with a particular wavelength and is, for example, a layer that selectively transmits red, green, or blue light. Alternatively, a region that transmits light emitted from the light-emitting element as it is may be provided.

The light-emitting module 380R, for example, includes the sealant 360 that is in contact with the light-emitting element 350R and the coloring layer 367R.

The coloring layer 367R is positioned in a region overlapping with the light-emitting element 350R. Accordingly, part of light emitted from the light-emitting element 350R passes through the sealant 360 that also serves as an optical adhesive layer and through the coloring layer 367R and is emitted to the outside of the light-emitting module 380R as indicated by arrows in FIGS. 15B and 15C.

Note that although the case where the light-emitting element is used as a display element is described here, one embodiment of the present invention is not limited thereto.

In this specification and the like, for example, a display element, a display device or a display panel which is a device including a display element, a light-emitting element, and a light-emitting device which is a device including a light-emitting element can employ a variety of modes or can include a variety of elements. The display element, the display device, the display panel, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL®, an interferometric modulator display (IMOD) element, a MEMS shutter display element, an optical-interference-type MEMS display element, an electrowetting element, a piezoelectric ceramic display, a display element including a carbon nanotube, and the like. Other than the above, display media whose contrast, luminance, reflectivity, transmittance, or the like is changed by an electrical or magnetic effect may be included. Note that examples of display devices using EL elements include an EL display. Examples of display devices including electron emitters include a field emission display (FED) and an SED-type flat panel display (SED: surface-conduction electron-emitter display). Examples of display devices using liquid crystal elements include a liquid crystal display (e.g., a transmissive liquid crystal display, a transflective liquid crystal display, a reflective liquid crystal display, a direct-view liquid crystal display, and a projection liquid crystal display). Examples of a display device including electronic ink, Electronic Liquid Powder®, or electrophoretic elements include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

[Touch Panel Structure]

The touch panel 300 includes a light-blocking layer 367BM on the counter substrate 370. The light-blocking layer 367BM is provided so as to surround the coloring layer (e.g., the coloring layer 367R).

The touch panel 300 includes an anti-reflective layer 367p positioned in a region overlapping with the display portion 301. As the anti-reflective layer 367p, a circular polarizing plate can be used, for example.

The touch panel 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300 includes the light-emitting element (e.g., the light-emitting element 350R) over the insulating film 321.

The touch panel 300 includes, over the insulating film 321, a partition wall 328 that overlaps with an end portion of the lower electrode 351R (see FIG. 15C). In addition, a spacer 329 that controls the distance between the substrate 310 and the counter substrate 370 is provided over the partition wall 328.

[Structure of Image Signal Line Driver Circuit]

The image signal line driver circuit 303s(1) includes a transistor 303t and a capacitor 303c. Note that the driver circuit can be formed in the same process and over the same substrate as those of the pixel circuits. As illustrated in FIG. 15B, the transistor 303t may include a second gate over the insulating film 321. The second gate may be electrically connected to a gate of the transistor 303t, or different potentials may be supplied thereto. The second gate may be provided in a transistor 308t, the transistor 302t, or the like if necessary.

[Structure of Imaging Pixel]

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

[Structures of Other Components]

The touch panel 300 includes a wiring 311 through which a signal is supplied. The wiring 311 is provided with a terminal 319. Note that an FPC 309(1) through which a signal such as an image signal or a synchronization signal is supplied is electrically connected to the terminal 319.

Note that a printed wiring board (PWB) may be attached to the FPC 309(1).

Transistors formed in the same process can be used as the transistor 302t, the transistor 303t, and the transistor 308t, and the like.

Transistors of a bottom-gate type, a top-gate type, or the like can be used.

As a gate, a source, and a drain of a transistor, and a wiring or an electrode included in a touch panel, a single-layer structure or a layered structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

An oxide semiconductor is preferably used as a semiconductor in which a channel of a transistor such as the transistor 302t, the transistor 303t, or the transistor 308t is formed. In particular, an oxide semiconductor having a wider band gap than silicon is preferably used. A semiconductor material having a wider band gap and a lower carrier density than silicon is preferably used because off-state leakage current of the transistor can be reduced.

The oxide semiconductor preferably contains at least indium (In) or zinc (Zn), for example. The oxide semiconductor further preferably contains an In-M-Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned perpendicular to a surface on which the semiconductor layer is formed or the top surface of the semiconductor layer and in which the adjacent crystal parts have no grain boundary.

There is no grain boundary in such an oxide semiconductor; therefore, generation of a crack in an oxide semiconductor film that is caused by stress when a display panel is bent is prevented. Such an oxide semiconductor can thus be preferably used for a flexible display panel that is used in a bent state, or the like.

The use of such materials for the semiconductor layer makes it possible to provide a highly reliable transistor in which a change in the electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed in each display region is maintained. As a result, a display device with an extremely low power consumption can be obtained.

Alternatively, silicon is preferably used as a semiconductor in which a channel of a transistor such as the transistor 302$t$, the transistor 303$t$, or the transistor 308$t$ is formed. Although amorphous silicon may be used as silicon, silicon having crystallinity is particularly preferably used. For example, microcrystalline silicon, polycrystalline silicon, single crystal silicon, or the like is preferably used. In particular, polycrystalline silicon can be formed at a lower temperature than single crystal silicon and has higher field effect mobility and higher reliability than amorphous silicon. When such a polycrystalline semiconductor is used for a pixel, the aperture ratio of the pixel can be improved. Even in the case where pixels are provided at extremely high resolution, a gate driver circuit and a source driver circuit can be formed over a substrate over which the pixels are formed, and the number of components of an electronic device can be reduced.

Here, a method for forming a flexible light-emitting panel is described.

For convenience, a structure including a pixel and a driver circuit, a structure including an optical member such as a color filter, a structure including a touch sensor, or a structure including a functional member is referred to as an element layer. An element layer includes a display element, for example, and may include a wiring electrically connected to a display element or an element such as a transistor used in a pixel or a circuit in addition to the display element.

Here, a support provided with an insulating surface over which an element layer is formed is called a base material.

As a method for forming an element layer over a flexible base material, there are a method in which an element layer is formed directly over a base material, and a method in which an element layer is formed over a supporting base material that has stiffness and then the element layer is separated from the supporting base material and transferred to the base material.

In the case where a material of the base material can withstand heating temperature in the process for forming the element layer, it is preferred that the element layer be formed directly over the base material, in which case a manufacturing process can be simplified. At this time, the element layer is preferably formed in a state where the base material is fixed to the supporting base material, in which case the transfer of the element layer in a device and between devices can be easy.

In the case of employing the method in which the element layer is formed over the supporting base material and then transferred to the base material, first, a separation layer and an insulating layer are stacked over a supporting base material, and then the element layer is formed over the insulating layer. Then, the element layer is separated from the supporting base material and then transferred to the base material. At this time, a material is selected such that separation at an interface between the supporting base material and the separation layer, at an interface between the separation layer and the insulating layer, or in the separation layer occurs. With such a method, the element layer can be formed at temperatures higher than the upper temperature limit of the base material, which improves the reliability.

For example, it is preferable that a stacked layer of a layer including a high-melting-point metal material, such as tungsten, and a layer including an oxide of the metal material be used as the separation layer, and a stacked layer of a plurality of layers as the insulating layer, such as a silicon nitride layer and a silicon oxynitride layer be used over the separation layer. By using a high-melting-point metal material, a high-temperature process can be performed to form the element layer, resulting in high reliability. For example, impurities contained in the element layer can be further reduced, and the crystallinity of a semiconductor or the like included in the element layer can be further increased.

Examples of the separation include peeling off by application of mechanical power, removal of the separation layer by etching, or separation by dripping of a liquid into part of the separation interface to penetrate the entire separation interface.

The separation layer is not necessarily provided in the case where separation can occur at an interface between the supporting base material and the insulating layer. For example, glass may be used as the supporting base material, an organic resin such as polyimide may be used as the insulating layer, a separation trigger may be formed by locally heating part of the organic resin by laser light or the like, and separation may be performed at an interface between the glass and the insulating layer. Alternatively, it is possible that a layer containing a material with high thermal conductivity (e.g., a metal or a semiconductor) is provided between the supporting base material and the insulating layer containing an organic resin, and this layer is heated by current so that separation easily occurs, and then separation is performed. In this case, the insulating layer containing an organic resin can also be used as the base material.

Examples of materials of such a flexible base material include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polytetrafluoroethylene (PTFE) resin, a polyamide resin, a cycloolefin resin, a polystyrene resin, a polyamide imide resin, and a polyvinyl chloride resin. In particular, a material whose thermal expansion coefficient is low, for example, lower than or equal to $30 \times 10^{-6}$/K is preferably used, and a polyamide imide resin, a polyimide resin, PET, or the like can suitably be used. Alternatively, a substrate in which a fibrous body is impregnated with a resin (also referred to as prepreg) or a substrate whose thermal expansion coefficient is reduced by mixing an inorganic filler with an organic resin can be used.

In the case where a fibrous body is included in the above material, a high-strength fiber of an organic compound or an inorganic compound is preferably used as the fibrous body. The high-strength fiber is specifically a fiber with a high tensile modulus of elasticity or a fiber with a high Young's modulus. Typical examples thereof include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

Note that for a display device of one embodiment of the present invention, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can be used. Such an element has few numbers of manufacturing steps; thus, the manufacturing cost can be reduced or yield can be improved. Furthermore, because the size of the element is small, the aperture ratio can be improved, so that power consumption can be reduced or higher luminance can be achieved.

As a method other than the active matrix method, the passive matrix method in which an active element (a non-linear element) is not used may be used. Since an active element (a non-linear element) is not used, the number of manufacturing steps is small, so that the manufacturing cost can be reduced or yield can be improved. Furthermore, since an active element (a non-linear element) is not used, the aperture ratio can be improved, so that power consumption can be reduced or higher luminance can be achieved, for example.

Note that an example of the case where a variety of display is performed using the display device is shown here; however, one embodiment of the present invention is not limited thereto. For example, data is not necessarily displayed. As an example, the display device may be used as a lighting device. By using the device as a lighting device, it can be used as interior lighting having an attractive design. Alternatively, it can be used as lighting with which various directions can be illuminated. Further alternatively, it may be used as a light source, e.g., a backlight or a front light, not the display device. In other words, it may be used as a lighting device for the display panel.

Here, in particular, in the case where the display device of one embodiment of the present invention is used for a television device for home use, digital signage, and a PID, it is preferable to use a touch panel for a display panel as described above because a device with such a structure does not just display a still or moving image, but can be operated by viewers intuitively. In the case where the display device of one embodiment of the present invention is used for advertisement, the effectiveness of the advertisement can be increased. Alternatively, in the case where the display device of one embodiment of the present invention is used for providing information such as route information and traffic information, usability can be enhanced by intuitive operation.

Note that in the case where a display panel does not need to function as a touch sensor, for example, in the case of using the display panel for large advertisements on the walls of buildings, public facilities, and the like, the display panel may have a structure in which the structure of the touch sensor is omitted from the above structure example of the touch panel.

Embodiment 3

In this embodiment, a display panel which can be used in the display device of one embodiment of the present invention is described with reference to drawings.

Here, as an example of the display panel, a touch panel serving as a touch sensor is described.

Figure 16A:
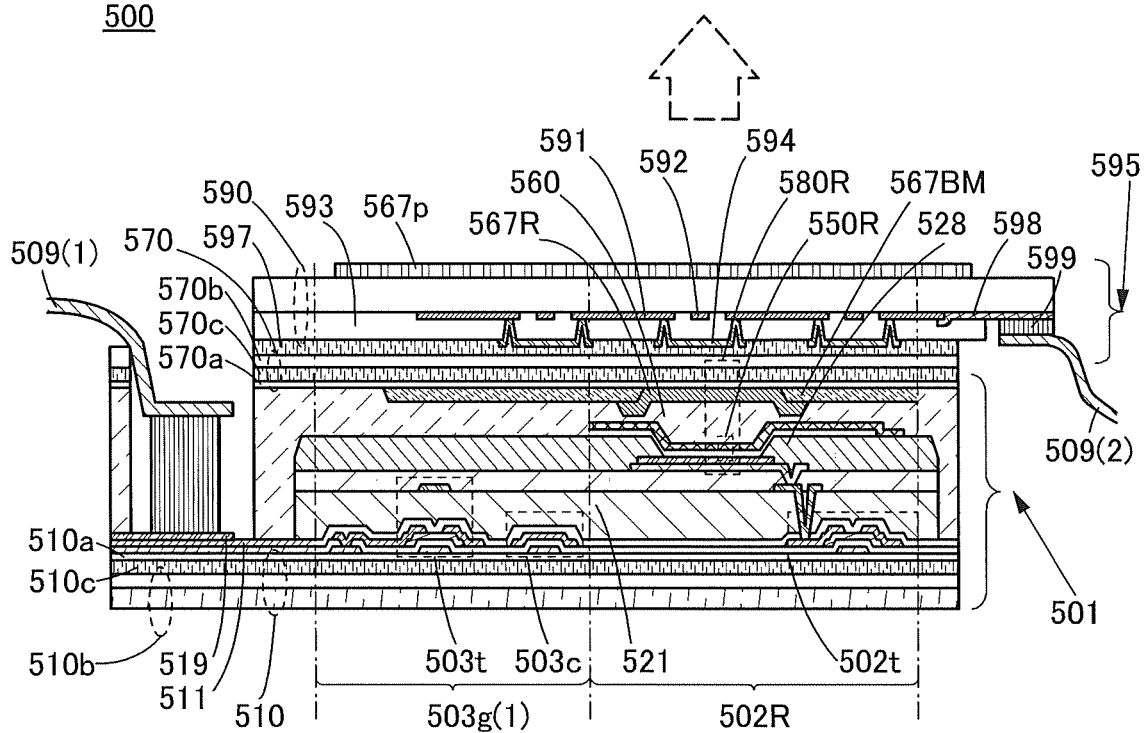
FIGS. 16A to 16C illustrate a touch panel of one embodiment.
Figure 16B:
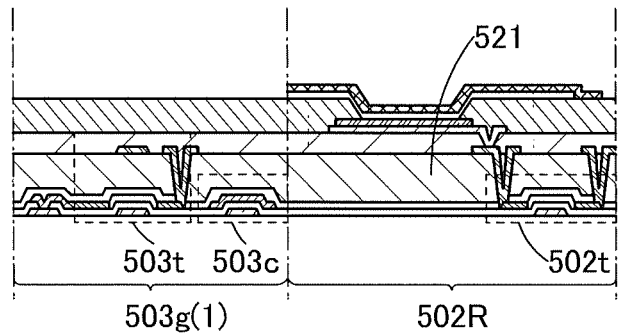
Figure 16C:
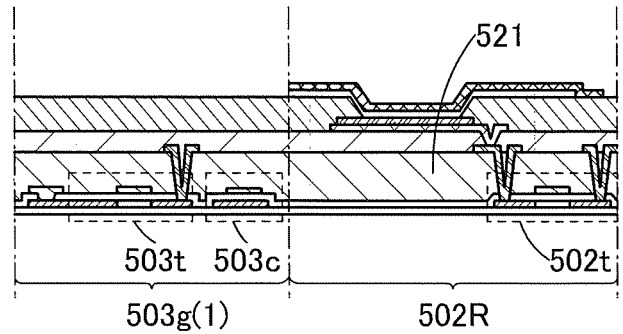

FIGS. 16A to 16C are cross-sectional views of a touch panel 500.

The touch panel 500 includes a display portion 501 and a touch sensor 595. The touch panel 500 further includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

[Touch Sensor]

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2).

As the touch sensor 595, a capacitive touch sensor can be used. Examples of the capacitive touch sensor include a surface capacitive touch sensor and a projected capacitive touch sensor.

Examples of the projected capacitive touch sensor include a self capacitive touch sensor and a mutual capacitive touch sensor, which differ mainly in the driving method. The use of a mutual capacitive type is preferable because multiple points can be sensed simultaneously.

The case of using a projected capacitive touch sensor will be described below.

Note that the structure of the touch sensor is not limited to the above structure, and a variety of sensors that can sense the proximity or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in the luminance of light penetrating the touch sensor 595 can be reduced.

Note that the electrodes 591 and the electrodes 592 can have any of a variety of shapes. For example, the plurality of electrodes 591 may be provided such that space between the electrodes 591 are reduced as much as possible, and the plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, a dummy electrode that is electrically insulated from these electrodes is preferably provided, whereby the area of a region having a different transmittance can be reduced.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591.

An adhesive layer 597 bonds the substrate 590 to the substrate 570 such that the touch sensor 595 overlaps with the display portion 501.

The electrodes 591 and the electrodes 592 are formed using a light-transmitting conductive material. As the light-transmitting conductive material, a conductive oxide such as indium oxide, indium tin oxide, indium zinc oxide, zinc oxide, or zinc oxide to which gallium is added, or graphene can be used. Alternatively, silver, copper, aluminum, a carbon nanotube, a metal halide (e.g., a silver halide), or the like may be used. Further alternatively, a metal nanowire including a number of conductors with an extremely small width (e.g., a diameter of several nanometers), or a metal mesh which is a net-like conductor may be used. For example, an Ag nanowire, a Cu nanowire, an Al nanowire, an Ag mesh, a Cu mesh, or an Al mesh may be used. In the case of using an Ag nanowire, light transmittance of 89% or more and a sheet resistance of 40 ohm/square or more and 100 ohm/square or less can be achieved. Note that because of having high transmittance, a metal nanowire, a metal mesh, a carbon nanotube, graphene, or the like may be used as an electrode of the display element, such as a pixel electrode or a common electrode.

The electrodes 591 and the electrodes 592 can be formed by depositing a light-transmitting conductive material on the substrate 590 by a sputtering method and then removing an unnecessary portion by any of various patterning techniques such as photolithography. Graphene can be formed by a CVD method or in such a manner that a solution in which graphene oxide is dispersed is applied and reduced.

Examples of a material for the insulating layer 593 include resins such as acrylic and an epoxy resin, a resin having a siloxane bond, and inorganic insulating materials such as silicon oxide, silicon oxynitride, and aluminum oxide.

Furthermore, openings reaching the electrodes 591 are formed in the insulating layer 593, and the wiring 594 electrically connects the adjacent electrodes 591. A light-transmitting conductive material can be favorably used for the wiring 594 because the aperture ratio of the touch panel can be increased. Moreover, a material with higher conductivity than those of the electrodes 591 and 592 can be favorably used for the wiring 594 because electric resistance can be reduced.

One electrode 592 extends in one direction, and the plurality of electrodes 592 is provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

A connection layer 599 electrically connects the wiring 598 to the FPC 509(2).

As the connection layer 599, any of anisotropic conductive films (ACF), anisotropic conductive pastes (ACP), and the like can be used.

The adhesive layer 597 has a light-transmitting property. For example, a thermosetting resin or an ultraviolet curable resin can be used; specifically, an acrylic resin, a urethane resin, an epoxy resin, or a resin having a siloxane bond can be used.

Note that the FPC 509(2), the light-blocking wiring electrically connected to the FPC 509(2), and the like may be placed not to overlap with the region 110 transmitting visible light.

[Display Portion]

The display portion 501 includes a plurality of pixels arranged in matrix. Each of the pixels includes a display element and a pixel circuit for driving the display element.

In this embodiment, an example of using an organic electroluminescent element that emits white light as a display element is described; however, the display element is not limited to such element.

Other than organic electroluminescent elements, for example, any of various display elements such as display elements (electronic ink) that perform display by an electrophoretic method, Electronic Liquid Powder® method, or the like; MEMS shutter display elements; and optical-interference-type MEMS display elements can be used. Note that a circuit structure suitable for employed display elements can be selected from among a variety of structures of pixel circuits.

The substrate 510 is a stack in which a flexible substrate 510b, a barrier film 510a that prevents diffusion of impurities to light-emitting elements, and an adhesive layer 510c that bonds the barrier film 510a to the substrate 510b are stacked.

The substrate 570 is a stack in which a flexible substrate 570b, a barrier film 570a that prevents diffusion of impurities to the light-emitting elements, and an adhesive layer 570c that bonds the barrier film 570a to the substrate 570b are stacked.

A sealant 560 bonds the substrate 570 to the substrate 510. The sealant 560 has a refractive index higher than that of air. In the case of extracting light to the sealant 560 side, the sealant 560 serves as an optical adhesive layer. The pixel circuits and the light-emitting elements (e.g., a light-emitting element 550R) are provided between the substrate 510 and the substrate 570.

[Pixel Structure]

The pixel includes a sub-pixel 502R, and the sub-pixel 502R includes a light-emitting module 580R.

The sub-pixel 502R includes the light-emitting element 550R and the pixel circuit that can supply electric power to the light-emitting element 550R and includes a transistor 502t. The light-emitting module 580R includes the light-emitting element 550R and an optical element (e.g., a coloring layer 567R).

The light-emitting element 550R includes a lower electrode, an upper electrode, and a layer containing a light-emitting organic compound between the lower electrode and the upper electrode.

The light-emitting module 580R includes the coloring layer 567R on the light extraction side. The coloring layer transmits light with a particular wavelength and is, for example, a layer that selectively transmits red, green, or blue light. Note that in another sub-pixel, a region that transmits light emitted from the light-emitting element as it is may be provided.

In the case where the sealant 560 is provided on the light extraction side, the sealant 560 is in contact with the light-emitting element 550R and the coloring layer 567R.

The coloring layer 567R is positioned in a region overlapping with the light-emitting element 550R. Accordingly, part of light emitted from the light-emitting element 550R passes through the coloring layer 567R and is emitted to the outside of the light-emitting module 580R as indicated by an arrow in FIG. 16A.

[Structure of Display Portion]

The display portion 501 includes a light-blocking layer 567BM on the light extraction side. The light-blocking layer 567BM is provided so as to surround the coloring layer (e.g., the coloring layer 567R).

The display portion 501 includes an anti-reflective layer 567p positioned in a region overlapping with the pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness due to the pixel circuit. A layered film including a layer that can prevent diffusion of impurities can be used as the insulating film 521. This can prevent decrease of the reliability of the transistor 502t or the like due to diffusion of impurities.

The display portion 501 includes the light-emitting elements (e.g., the light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided over the partition wall 528.

[Configuration of Scan Line Driver Circuit]

A scan line driver circuit 503g(1) includes a transistor 503t and a capacitor 503c. Note that the driver circuit can be formed in the same process and over the same substrate as those of the pixel circuits.

[Structures of Other Components]

The display portion 501 includes the wirings 511 through which signals are supplied. The wirings 511 are provided with the terminal 519. Note that the FPC 509(1) through which a signal such as an image signal or a synchronization signal are supplied is electrically connected to the terminal 519.

Note that a printed wiring board (PWB) may be attached to the FPC 509(1).

[Modification Example of Display Portion]

Any of various kinds of transistors can be used in the display portion 501.

FIGS. 16A and 16B each illustrate a structure in which bottom-gate transistors are used in the display portion 501.

For example, a semiconductor layer containing an oxide semiconductor, amorphous silicon, or the like can be used in the transistor 502t and the transistor 503t illustrated in FIG. 16A.

For example, a semiconductor layer containing polycrystalline silicon or the like can be used in the transistor 502t and the transistor 503t illustrated in FIG. 16B.

A structure of the case where top-gate transistors are used in the display portion 501 is illustrated in FIG. 16C.

For example, a semiconductor layer containing an oxide semiconductor, polycrystalline silicon, a transferred single crystal silicon film, or the like can be used in the transistor 502t and the transistor 503t in FIG. 16C.

At least part of this embodiment can be implemented in combination with any of the other embodiments described in this specification as appropriate.

Embodiment 4

In this embodiment, a display panel which can be used in a display device of one embodiment of the present invention is described with reference to drawings. Here, as an example of the display panel, a touch panel serving as a touch sensor is described.

Figure 17A:
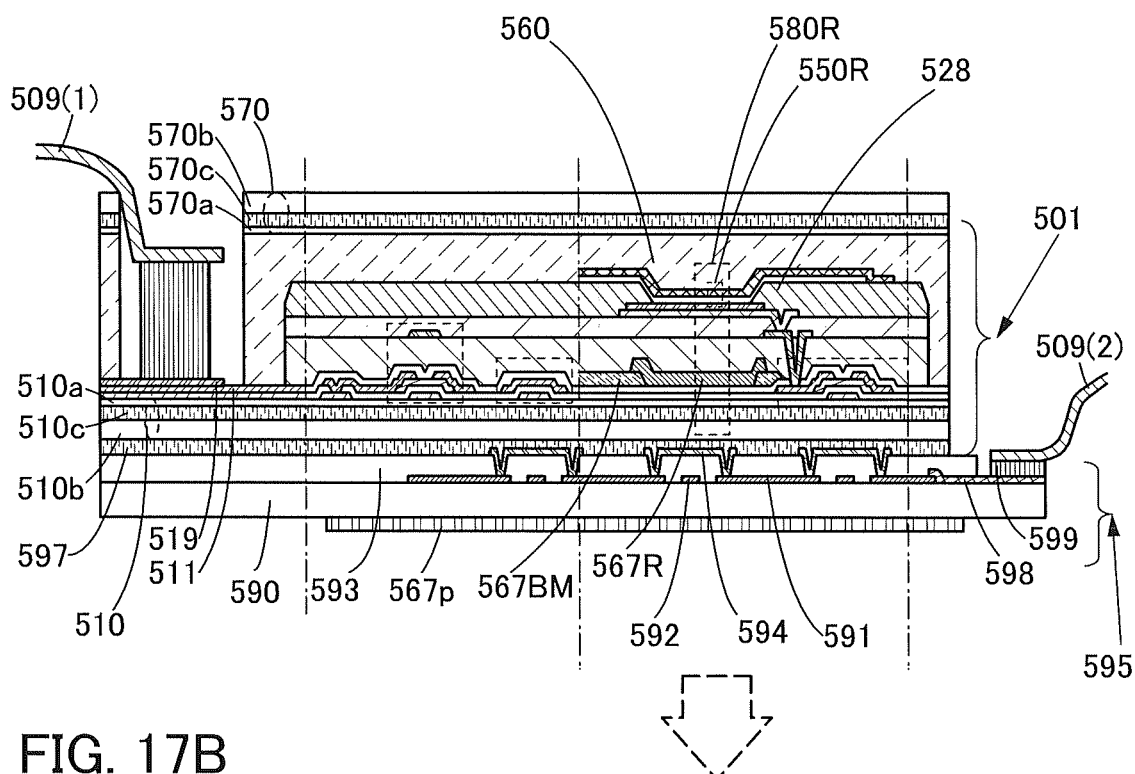
FIGS. 17A to 17C each illustrate a touch panel of one embodiment.
Figure 17B:
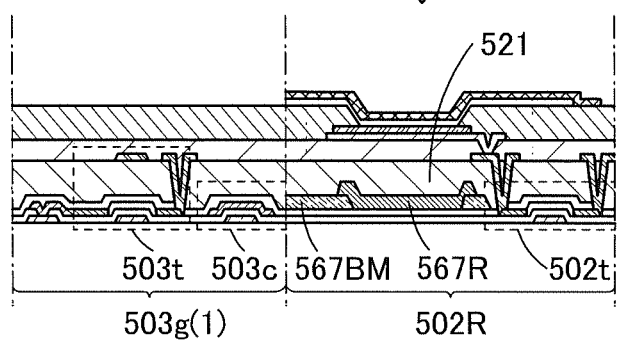
Figure 17C:
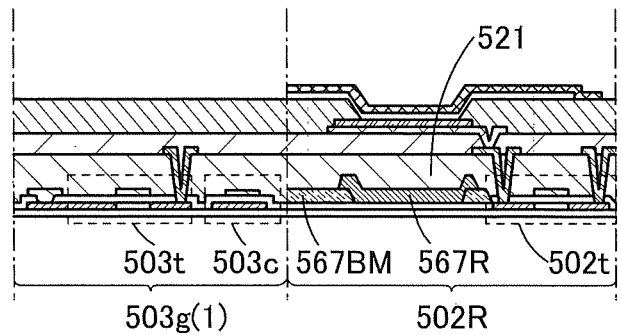

FIGS. 17A to 17C are cross-sectional views of a touch panel 500B.

The touch panel 500B described in this embodiment is different from the touch panel 500 described in Embodiment 3 in that the display portion 501 displays received image data to the side where the transistors are provided and that the touch sensor is provided on the substrate 510 side of the display portion. Different structures will be described in detail below, and the above description is referred to for the other similar structures.

[Display Portion]

The display portion 501 includes a plurality of pixels arranged in matrix. Each of the pixels includes a display element and a pixel circuit for driving the display element.

[Pixel Structure]

A pixel includes a sub-pixel 502R, and the sub-pixel 502R includes a light-emitting module 580R.

The sub-pixel 502R includes the light-emitting element 550R and the pixel circuit that can supply electric power to the light-emitting element 550R and includes a transistor 502t.

The light-emitting module 580R includes the light-emitting element 550R and an optical element (e.g., the coloring layer 567R).

The light-emitting element 550R includes a lower electrode, an upper electrode, and a layer containing a light-emitting organic compound between the lower electrode and the upper electrode.

The light-emitting module 580R includes the coloring layer 567R on the light extraction side. The coloring layer transmits light with a particular wavelength and is, for example, a layer that selectively transmits red, green, or blue light. Note that in another sub-pixel, a region that transmits light emitted from the light-emitting element as it is may be provided.

The coloring layer 567R is positioned in a region overlapping with the light-emitting element 550R. The light-emitting element 550R illustrated in FIG. 17A emits light to the side where the transistor 502t is provided. Accordingly, part of light emitted from the light-emitting element 550R passes through the coloring layer 567R and is emitted to the outside of the light-emitting module 580R as indicated by an arrow in FIG. 17A.

[Structure of Display Portion]

The display portion 501 includes a light-blocking layer 567BM on the light extraction side. The light-blocking layer 567BM is provided so as to surround the coloring layer (e.g., the coloring layer 567R).

The display portion 501 includes an insulating film 521. The insulating film 521 covers the transistor 502t. Note that the insulating film 521 can be used as a layer for planarizing unevenness due to the pixel circuit. A layered film including a layer that can prevent diffusion of impurities can be used as the insulating film 521. This can prevent the decrease of the reliability of the transistor 502t or the like due to diffusion of impurities from the coloring layer 567R.

[Touch Sensor]

The touch sensor 595 is provided on the substrate 510 side of the display portion 501 (see FIG. 17A).

The adhesive layer 597 is provided between the substrate 510 and the substrate 590 and bonds the touch sensor 595 to the display portion 501.

Note that the FPC 509(2), the light-blocking wiring electrically connected to the FPC 509(2), and the like may be placed not to overlap with the region 110 transmitting visible light.

[Modification Example of Display Portion]

Any of various kinds of transistors can be used in the display portion 501.

FIGS. 17A and 17B illustrate a structure of the case where bottom-gate transistors are used in the display portion 501.

For example, a semiconductor layer containing an oxide semiconductor, amorphous silicon, or the like can be used in the transistor 502t and the transistor 503t illustrated in FIG. 17A.

For example, a semiconductor layer containing polycrystalline silicon or the like can be used in the transistor 502t and the transistor 503t illustrated in FIG. 17B.

FIG. 17C illustrates a structure of the case where top-gate transistors are used in the display portion 501.

For example, a semiconductor layer containing an oxide semiconductor, polycrystalline silicon, a transferred single crystal silicon film, or the like can be used in the transistor 502t and the transistor 503t illustrated in FIG. 17C.

At least part of this embodiment can be implemented in combination with any of the other embodiments described in this specification as appropriate.

Embodiment 5

In this embodiment, application examples of a display device of one embodiment of the present invention and electronic devices and the like including display devices will be described.

As examples of electronic devices including a display device with flexibility, the following can be given: television devices (also referred to as televisions or television receivers), monitors of computers or the like, cameras such as digital cameras or digital video cameras, digital photo frames, mobile phones (also referred to as mobile phones or mobile phone devices), portable game machines, portable information terminals, audio reproducing devices, large game machines such as pachinko machines, and the like.

In addition, a lighting device or a display device can be incorporated along a curved inside/outside wall surface of a house or a building or a curved interior/exterior surface of a car.

In the display device 10 of one embodiment of the present invention, by increasing the number of display panels 100, the area of the display region 11 can be increased unlimitedly. Thus, the display device 10 can be favorably used for applications for displaying a large image, such as digital signage and a PID. Furthermore, by changing the arrangement of the display panels 100, the contour of the display device 10 of one embodiment of the present invention can have any of a variety of shapes.

Figure 18:
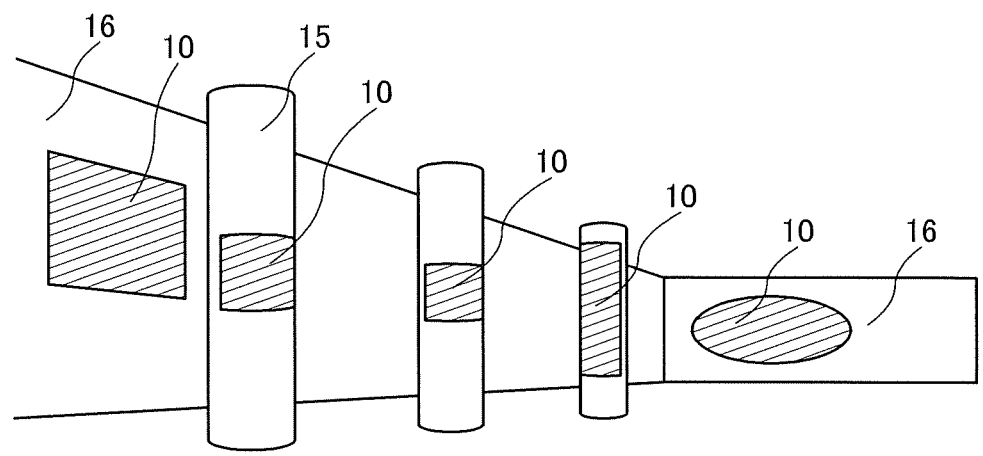
FIG. 18 illustrates application examples of a display device of one embodiment.

FIG. 18 shows an example in which the display device 10 of one embodiment of the present invention is provided for a column 15 and a wall 16. A flexible display panel is used as the display panel 100 included in the display device 10, whereby the display device 10 can be placed along a curved surface.

The display device 10 of one embodiment of the present invention can be used in an electronic device such as a portable information terminal in the case where a plurality of small-sized display panels 100 are used.

An electronic device of one embodiment of the present invention may include a touch panel and a secondary battery. It is preferable that the secondary battery is capable of being charged by contactless power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include a touch panel and an antenna. When a signal is received by the antenna, the electronic device can display an image, data, or the like on a display portion. When the electronic device includes a secondary battery, the antenna may be used for contactless power transmission.

Figure 19A:
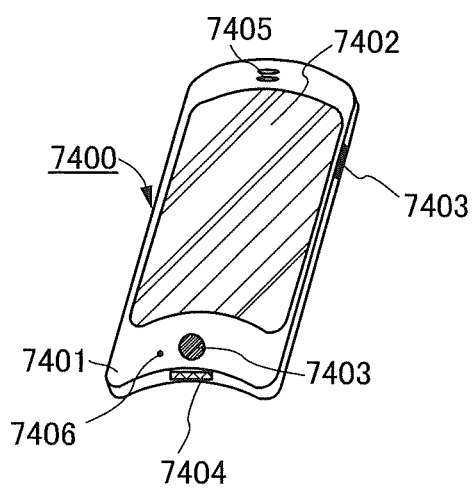
FIGS. 19A to 19G illustrate examples of electronic devices and lighting devices.

FIG. 19A illustrates an example of a mobile phone. The mobile phone 7400 is provided with a display portion 7402 incorporated in a housing 7401, operation buttons 7403, an external connection port 7404, a speaker 7405, a microphone 7406, and the like. Note that the mobile phone 7400 is manufactured by using the touch panel of one embodiment of the present invention for the display portion 7402. In accordance with one embodiment of the present invention, highly reliable mobile phones each having a curved display portion can be provided at a high yield.

When the display portion 7402 of the mobile phone 7400 illustrated in FIG. 19A is touched with a finger or the like, data can be input into the mobile phone 7400. Further, operations such as making a call and inputting a letter can be performed by touch on the display portion 7402 with a finger or the like.

With the operation buttons 7403, power ON or OFF can be switched. In addition, types of images displayed on the display portion 7402 can be switched; switching images from a mail creation screen to a main menu screen.

Figure 19B:
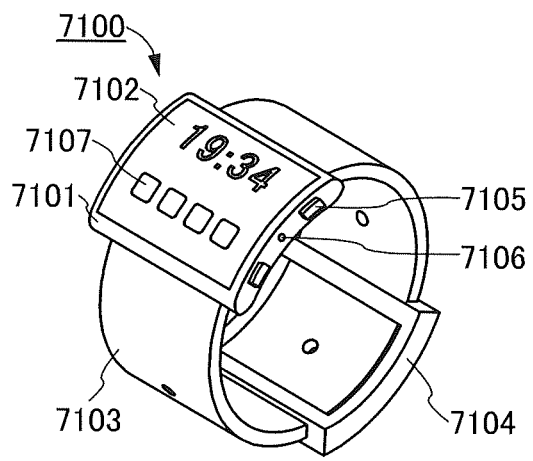

FIG. 19B illustrates an example of a wrist-watch-type portable information terminal. A portable information terminal 7100 includes a housing 7101, a display portion 7102, a band 7103, a buckle 7104, an operation button 7105, an input/output terminal 7106, and the like.

The portable information terminal 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as time setting, power ON/OFF, ON/OFF of wireless communication, setting and cancellation of manner mode, and setting and cancellation of power saving mode can be performed. For example, the functions of the operation button 7105 can be set freely by the operating system incorporated in the portable information terminal 7100.

The portable information terminal 7100 can employ near field communication that is a communication method based on an existing communication standard. In that case, for example, mutual communication between the portable information terminal 7100 and a headset capable of wireless communication can be performed, and thus hands-free calling is possible.

Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

The display portion 7102 of the portable information terminal 7100 includes the touch panel of one embodiment of the present invention. According to one embodiment of the present invention, highly reliable portable information terminals each having a curved display portion can be provided with a high yield.

Figure 19C:
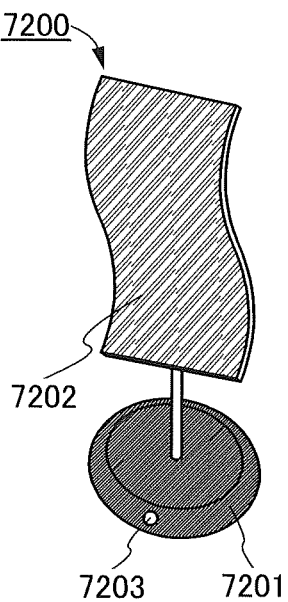
Figure 19D:
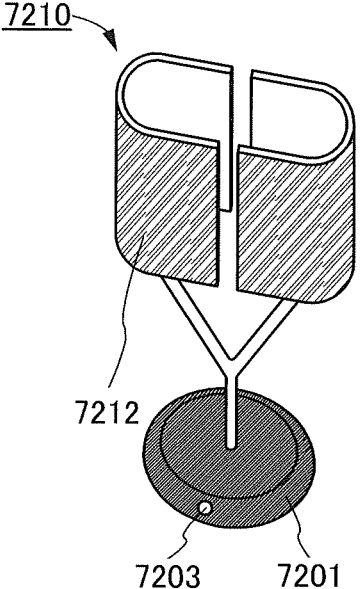
Figure 19E:
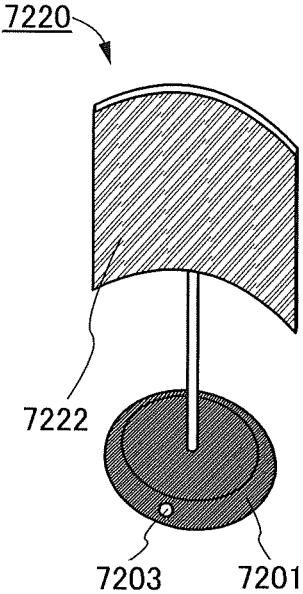

FIGS. 19C to 19E illustrate examples of lighting devices. Lighting devices 7200, 7210, and 7220 each include a stage 7201 provided with an operation switch 7203 and a light-emitting portion supported by the stage 7201.

The lighting device 7200 illustrated in FIG. 19C includes a light-emitting portion 7202 with a wave-shaped light-emitting surface and thus is a good-design lighting device.

A light-emitting portion 7212 included in the lighting device 7210 illustrated in FIG. 19D has two convex-curved light-emitting portions symmetrically placed. Thus, all directions can be illuminated with the lighting device 7210 as a center.

The lighting device 7220 illustrated in FIG. 19E includes a concave-curved light-emitting portion 7222. This is suitable for illuminating a specific range because light emitted from the light-emitting portion 7222 is collected to the front of the lighting device 7220.

The light-emitting portion included in each of the lighting devices 7200, 7210, and 7220 are flexible; thus, the light-emitting portion may be fixed on a plastic member, a movable frame, or the like so that an emission surface of the light-emitting portion can be bent freely depending on the intended use.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

Here, the light-emitting portions each include the touch panel of one embodiment of the present invention. In accordance with one embodiment of the present invention, highly reliable lighting devices each having a curved light-emitting portion can be provided at a high yield.

Figure 19F:
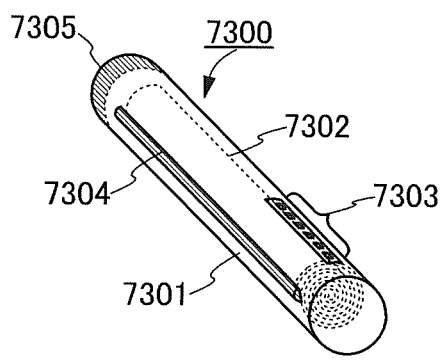

FIG. 19F illustrates an example of a portable touch panel. A touch panel 7300 includes a housing 7301, a display portion 7302, operation buttons 7303, a display portion pull 7304, and a control portion 7305.

The touch panel 7300 includes a rolled flexible display portion 7302 in the cylindrical housing 7301.

The touch panel 7300 can receive a video signal with the control portion 7305 and can display the received video on the display portion 7302. In addition, a battery is included in the control portion 7305. Moreover, a terminal portion for connecting a connector may be included in the control portion 7305 so that a video signal or power can be directly supplied from the outside with a wiring.

By pressing the operation buttons 7303, power ON/OFF, switching of displayed videos, and the like can be performed.

Figure 19G:
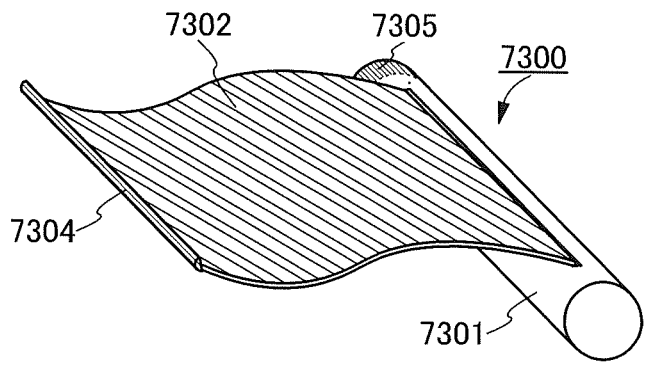

FIG. 19G illustrates a touch panel 7300 in a state where the display portion 7302 is pulled out with the display portion pull 7304. Videos can be displayed on the display portion 7302 in this state. Further, the operation buttons 7303 on the surface of the housing 7301 allow one-handed operation. The operation button 7303 is provided not in the center of the housing 7301 but on one side of the housing 7301 as illustrated in FIG. 19F, which makes one-handed operation easy.

Note that a reinforcement frame may be provided for a side portion of the display portion 7302 so that the display portion 7302 has a flat display surface when pulled out.

Note that in addition to this structure, a speaker may be provided for the housing so that sound is output with an audio signal received together with a video signal.

The display portion 7302 includes the touch panel of one embodiment of the present invention. According to one embodiment of the present invention, lightweight and highly reliable touch panels can be provided with a high yield.

At least part of this embodiment can be implemented in combination with any of the embodiments described in this specification as appropriate.

This application is based on Japanese Patent Application serial no. 2014-147636 filed with Japan Patent Office on Jul. 18, 2014, the entire contents of which are hereby incorporated by reference.

What is claimed is:

1. A display device comprising:
    a first display panel; and
    a second display panel over a portion of the first display panel,
    wherein each of the first display panel and the second display panel comprises a display portion and a region transmitting visible light,
    wherein the display portion of the first display panel includes a first region which is not overlapped with the second display panel,
    wherein the display portion of the first display panel includes a second region which is overlapped with the region transmitting visible light of the second display panel,
    wherein the first region includes a first pixel including a first sub-pixel and the second region includes a second pixel including a second sub-pixel,
    wherein a size of the second sub-pixel is larger than a size of the first sub-pixel, and
    wherein an aperture ratio of the second pixel is higher than an aperture ratio of the first pixel.

2. The display device according to claim 1, further comprising a third display panel comprising a display portion and a region transmitting visible light, wherein the display portion of the second display panel includes a third region which is not overlapped with the third display panel,
wherein the display portion of the second display panel includes a fourth region which is overlapped with the region transmitting visible light of the third display panel,
wherein the third region includes a third pixel and the fourth region includes a fourth pixel, and
wherein an aperture ratio of the fourth pixel is higher than an aperture ratio of the third pixel.

3. The display device according to claim 1,
wherein each of the first display panel and the second display panel comprises a region blocking visible light,
wherein the region blocking visible light in the portion of the first display panel overlaps with the display portion of the second display panel, and
wherein the region blocking visible light of the second display panel does not overlap with the display portion of the first display panel.

4. The display device according to claim 1, further comprising a first FPC electrically connected to the first display panel and a second FPC electrically connected to the second display panel,
wherein the first FPC is between the first display panel and the second display panel.

5. The display device according to claim 1,
wherein each of the first display panel and the second display panel comprises a substrate, and
wherein the substrate has flexibility.

6. A display module comprising:
the display device according to claim 1; and
a touch sensor.

7. An electronic device comprising:
the display device according to claim 1; and
a housing,
wherein the housing includes at least one of a button, a microphone, a speaker, an antenna, and a battery.

8. The display device according to claim 1,
wherein light is emitted to outside through the second display panel.

9. A display device comprising:
a first display panel; and
a second display panel over a portion of the first display panel,
wherein each of the first display panel and the second display panel comprises a display portion and a region transmitting visible light,
wherein the display portion of the first display panel includes a first region which is not overlapped with the second display panel,
wherein the display portion of the first display panel includes a second region which is overlapped with the region transmitting visible light of the second display panel,
wherein the first region includes a first pixel and the second region includes a second pixel,
wherein the first pixel includes a first display element and a light-blocking layer including a first opening,
wherein the first opening is overlapped with the first display element,
wherein the second pixel includes a second display element and a light-blocking layer including a second opening,
wherein the second opening is overlapped with the second display element, and
wherein an area of the second opening is larger than an area of the first opening.

10. The display device according to claim 9, further comprising a third display panel comprising a display portion and a region transmitting visible light,
wherein the display portion of the second display panel includes a third region which is not overlapped with the third display panel,
wherein the display portion of the second display panel includes a fourth region which is overlapped with the region transmitting visible light of the third display panel,
wherein the third region includes a third pixel and the fourth region includes a fourth pixel, and
wherein an aperture ratio of the fourth pixel is higher than an aperture ratio of the third pixel.

11. The display device according to claim 9,
wherein each of the first display panel and the second display panel comprises a region blocking visible light,
wherein the region blocking visible light in the portion of the first display panel overlaps with the display portion of the second display panel, and
wherein the region blocking visible light of the second display panel does not overlap with the display portion of the first display panel.

12. The display device according to claim 9, further comprising a first FPC electrically connected to the first display panel and a second FPC electrically connected to the second display panel,
wherein the first FPC is between the first display panel and the second display panel.

13. The display device according to claim 9,
wherein each of the first display panel and the second display panel comprises a substrate, and
wherein the substrate has flexibility.

14. A display module comprising:
the display device according to claim 9; and
a touch sensor.

15. An electronic device comprising:
the display device according to claim 9; and
a housing,
wherein the housing includes at least one of a button, a microphone, a speaker, an antenna, and a battery.

16. The display device according to claim 9,
wherein the first display element and the second display element are light-emitting elements or liquid crystal elements.

* * * * *